US008769094B2

(12) United States Patent
Phillips

(10) Patent No.: US 8,769,094 B2
(45) Date of Patent: *Jul. 1, 2014

(54) SYSTEMS, DEVICES, AND/OR METHODS FOR MANAGING SAMPLE SELECTION BIAS

(71) Applicant: AT&T Intellectual Property I, LP, Atlanta, GA (US)

(72) Inventor: Steven Phillips, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/652,184

(22) Filed: Oct. 15, 2012

(65) Prior Publication Data

US 2013/0041650 A1 Feb. 14, 2013

Related U.S. Application Data

(63) Continuation of application No. 12/342,233, filed on Dec. 23, 2008, now Pat. No. 8,291,069.

(51) Int. Cl.
G06F 15/173 (2006.01)
G06F 17/00 (2006.01)

(52) U.S. Cl.
USPC ............................................ 709/224; 706/46

(58) Field of Classification Search
USPC ............ 709/204, 220–226; 706/1–20, 40–46;
705/6, 1, 28, 26, 27, 56, 35, 37, 44, 10;
375/341–355
See application file for complete search history.

(56) References Cited

U.S. PATENT DOCUMENTS

| 6,049,767 | A  | * | 4/2000  | Printz ........................... 704/240 |
| 6,920,405 | B2 |   | 7/2005  | Lawrence |
| 7,046,963 | B2 |   | 5/2006  | Luo et al. |
| 7,089,241 | B1 |   | 8/2006  | Alspector et al. |
| 7,301,990 | B2 |   | 11/2007 | Jayaraman et al. |
| 7,577,560 | B2 | * | 8/2009  | Imada et al. ..................... 703/24 |
| 2003/0023416 | A1 |   | 1/2003  | Peterson et al. |
| 2005/0086590 | A1 |   | 4/2005  | Lee et al. |
| 2008/0162117 | A1 | * | 7/2008  | Bangalore et al. .............. 704/10 |
| 2008/0256011 | A1 |   | 10/2008 | Rice |
| 2009/0016470 | A1 | * | 1/2009  | van der Laan ................ 375/341 |
| 2009/0089058 | A1 | * | 4/2009  | Bellegarda .................... 704/251 |

OTHER PUBLICATIONS

Phillips et al., 'Maximum entropy modeling of species geographic distribution', ecological modeling, Mar. 2005.*
Anderson, "Real vs. Artefactual Absences in Species Distributions: Tests for *Oryzomys Albigularis* (Rodentia: Muridae) in Venezuela", Apr. 1, 2003, 15 pages, Journal of Biogeography 30 (4), Blackwell Publishing Ltd.

(Continued)

Primary Examiner — Glenton B Burgess
Assistant Examiner — Mark O Afolabi
(74) Attorney, Agent, or Firm — Akerman LLP; Michael K. Dixon; Roy P. Zachariah

(57) ABSTRACT

Certain exemplary embodiments can provide a method that can include, via a special purpose processor, automatically determining an unbiased estimate of a distribution from occurrence data having an occurrence data sample selection bias substantially equivalent to a background data sample selection bias, the occurrence data related to background data, the background data chosen with the background data sample selection bias, the occurrence data representing a physically-measurable variable of one or more physical and tangible objects or substances.

18 Claims, 8 Drawing Sheets

(56) References Cited

OTHER PUBLICATIONS

Argaez, "Prediction of Potential Areas of Species Distributions Based on Presence-only Data", Mar. 1, 2005, 18 pages, Environmental and Ecological Statistics, 12(1), Springer Netherlands.
Boyce, "Evaluating Resource Selection Functions", Nov. 30, 2002, 20 pages, Ecological Modelling 157; Elsevier.
Cadman, "Atlas of the Breeding Birds of Ontario, 2001-2005", Jan. 1, 2007, Draft Maps available at: www.birdsontario.org.
Carpenter, "Domain: A Flexible Modelling Procedure for Mapping Potential Distributions of Plants and Animals", Dec. 1, 1993, 14 pages, Biodiversity and Conservation, 2, Springer Netherlands.
Cawsey, "Regional Vegetation Mapping in Australia: A Case Study in the Practical Use of Statistical Modelling", Dec. 1, 2002, 36 pages, Biodiversity and Conservation 11(12); Kluwer Academic, Netherlands.
Dennis, "Bias in Butterfly Distribution Maps: the Influence of Hot Spots and Recorder's Home Range", Jun. 1, 2000, 5 pages, Journal of Insect Conservation, 4(2), Kluwer Academic Publishers, Netherlands.
Dudik, "Correcting Sample Selection Bias in Maximum Entropy Density Estimation", Jan. 1, 2005, 8 pages, Advances in Neural Information Processing Systems, 18, MIT Press.
Dudik, "Maximum Entropy Density Estimation with Generalized Regularization and an Application to Species Distribution Modeling", Jun. 1, 2007, 44 pages, Journal of Machine Learning Research 8.
Elith, "Novel Methods Improve Prediction of Species' Distributions from Occurrence Data", Jan. 25, 2006, 23 pages, Ecography 29(2).
Engler, "An Improved Approach for Predicting the Distribution of Rare and Endangered Species from Occurrence and Pseudo-Absence Data", Apr. 1, 2004, 12 pages, Journal of Applied Ecology, 41(2), British Ecological Society.
Ferrier, "Extended Statistical Approaches to Modelling Spatial Pattern in Biodiversity in Northeast New South Wales", Dec. 1, 2002, 33 pages, Biodiversity and Conservation, 11(12); Kluwer Academic Publishers, Netherlands.
Friedman, "Greedy Function Approximation: A Gradient Boosting Machine", Feb. 24, 1999, 34 pages, The Annals of Statistics 29(5), JSTOR.
Graham, "New Developments in Museum-Based Informatics and Applications in Biodiversity Analysis", Sep. 1, 2004, 7 pages, Trends in Ecology and Evolution, 19(9), Elsevier.
Guisan, "Generalized Linear and Generalized Additive Models in Studies of Species Distributions: Setting the Scene", Nov. 30, 2002, 12 pages, Ecological Modelling, 157(2-3), Elsevier.
Guisan, "What Matters for Predicting the Occurrences of Trees: Techniques, Data, or Species' Characteristics?", Nov. 1, 2007, 16 pages, Ecological Monographs, 77(4); Ecological Society of America.
Heckman, "Sample Selection Bias as a Specification Error", Jan. 1, 1979, 9 pages, Econometrica, 47(1), The Econometric Society.
Hernandez, "The Effect of Sample Size and Species Characteristics on Performance of Different Species Distribution Modeling Methods", Oct. 1, 2006, 13 pages, Ecography 29(5).
Hirzel, "Ecological-Niche Factor Analysis: How to Compute Habitat-Suitability Maps Without Absence Data?", Jul. 1, 2002, 10 pages, Ecology, 83(7); Ecological Society of America.
Huang, "Correcting Sample Selection Bias by Unlabeled Data", Dec. 1, 2006, 8 pages, Advances in Neural Information Processing Systems, 19; MIT Press.
Jaynes, "Information Theory and Statistical Mechanics", May 15, 1957, 11 pages, Physical Review, 106(4).
Keating, "Use and Interpretation of Logistic Regression in Habitat-Selection Studies", Oct. 1, 2004, 16 pages, Journal of Wildlife Management 68(4).
Leathwick, "Using Multivariate Adaptive Regression Splines to Predict the Distributions of New Zealand's Freshwater Diadromous Fish", Dec. 1, 2005, 19 pages, Freshwater Biology, 50(12).
Leathwick, "Variation in Demersal Fish Species Richness in the Oceans Surrounding New Zealand: an Analysis Using Boosted Regression Trees", Aug. 22, 2005, 41 pages, Marine Ecology Progress Series 321.
Lehmann, "GRASP: Generalized Regression Analysis and Spatial Prediction", Nov. 30, 2002, 19 pages, Ecological Modelling 157.
Peterson, "Conservatism of Ecological Niches in Evolutionary Time", Aug. 1, 1999, 3 pages, Science, 285(5431).
Peterson, "New Distributional Modelling Approaches for Gap Analysis", Feb. 6, 2003, 8 pages, Animal Conservation 6.
Phillips, "A Maximum Entropy Approach to Species Distribution Modeling", Jul. 4, 2004, 8 pages, Proceedings of the 21st International Conference on Machine Learning, ACM.
Phillips, "Maximum Entropy Modeling of Species Geographic Distributions", Jul. 14, 2005, 29 pages, Ecological Modelling 190.
Phillips, "Modeling of Species Distributions with Maxent: New Extensions and a Comprehensive Evaluation", Apr. 1, 2008, 15 pages, Ecography, 31(2); Blackwell Publishing.
Stockwell, "The GARP Modelling System: Problems and Solutions to Automated Spatial Prediction", Jan. 1, 1999, 16 pages, International Journal of Geographical Information Science, 13(2).
Suarez, "The Value of Museum Collections for Research and Society", Jan. 1, 2004, 9 pages, BioScience 54(1) Thomas, Extinction Risk from.
Thomas, "Extinction Risk from Climate Change", Jan. 8, 2004, 4 pages, Nature 427(8); Nature Publishing Group.
Thuiller, "Niche-based Modelling as a Tool for Predicting the Risk of Alien Plant Invasions at a Global Scale", Dec. 1, 2005, 17 pages, Global Change Biology 11; Blackwell Publishing.
Ward, "Presence-Only Data and the EM Algorithm", Aug. 8, 2008, 24 pages, Biometrics; The International Biometric Society.
Zadrozny, "Learning and Evaluating Classifiers Under Sample Selection Bias", Jul. 4, 2004, 8 pages, Proceedings of the 21st International Conference on Machine Learning; ACM.
Zaniewski, "Predicting Species Spatial Distributions Using Presence-Only Data: a Case Study of Native New Zealand Ferns", Nov. 30, 2002, 20 pages, Ecological Modelling 157; Elsevier.
Busby, "BIOCLIM—A Bioclimate Analysis and Prediction System", Jan. 1, 1991, 5 page(s), Nature Conservation: Cost Effective Biological Surveys and Data Analysis; CSIRO.
De'Ath, "Boosted Trees for Ecological Modeling and Prediction", Jan. 1, 2007, 9 page(s), Ecology, 88(1); Ecological Society of America.
Elith, "Predicting Species Distributions from Museum and Herbarium Records Using Multiresponse Models Fitted with Multivariate Adaptive Regression Splines", May 1, 2007, 50 page(s), Diversity and Distributions 13(3).
Fielding, "A Review of Methods for the Assessment of Prediction Errors in Conservation Presence/Absence Models", Mar. 1, 1997, 12 page(s), Environmental Conservation 24(1).
Friedman, "Multivariate Adaptive Regression Splines", Mar. 1, 1991, 88 page(s), The Annals of Statistics, 19(1); Institute of Mathematical Statistics.
Gelfand, "Explaining Species Distribution Patterns through Hierarchical Modeling", Jan. 1, 2006, 52 page(s), Bayesian Analysis 1(1) (2006); International Society for Bayesian Analysis.
Kozak, "Integrating GIS-based Environmental data into Evolutionary Biology", Mar. 1, 2008, 8 page(s), Trends in Ecology and Evolution, 23(3).
Lancaster, "Case-control studies with Contaminated Controls", Jan. 1, 1996, 16 page(s), Journal of Econometrics, 71.
Loiselle, "Avoiding Pitfalls of Using Species Distribution Models in Conservation Planning", Dec. 1, 2003, 10 page(s), Conservation Biology 17(6).
Lutolf, "The ghost of past species occurrence: improving species distribution models for presence-only data", Aug. 1, 2006, 14 page(s), Journal of Applied Ecology, 43(4).
Ponder, "Evaluation of Museum Collection Data for Use in Biodiversity Assessment", Jun. 1, 2000, 10 page(s), Conservation Biology, 15.
Reddy, "Geographical Sampling Bias and its Implications for Conservation Priorities in Africa", Nov. 1, 2003, 9 page(s), Journal of Biogeography, 30.

(56) References Cited

OTHER PUBLICATIONS

Schulman, "Analysing Botanical Collecting Effort in Amazonia and Correcting for it in Species Range Estimation", Aug. 1, 2007, 12 page(s), Journal of Biogeography 34(8); Blackwell Publishing Ltd.

Hastie, "Generalized Additive Models", 1990, 335 page(s), Monographs on Statistics and Probability 43; Chapman & Hall/CRC.

Manly, "Resource Selection by Animals: Statistical Design and Analysis for Field Studies, 2nd Edition", 2002, 221 page(s), Kluwer Academic Publishers.

Yee, "Generalized Additive Models in Plant Ecology", Dec. 1, 1991, 16 page(s), Journal of Vegetation Science, 2 (5); IAVS: Opulus Press Uppsala, USA.

Zheng, "Summarizing the Predictive Power of a Generalized Linear Model", Jul. 15, 2000, 11 page(s), Statistics in Medicine, 19(13); John Wiley & Sons, Ltd.

Ward, "Statistics in Ecological Modeling; Presense-Only Data and Boosted Mars," Dissertation from Stanford University, p. 1-128, Sep. 2007.

Pearce et al. "Modeling distribution and abundance with presense-only data," Journal of Applied Ecology 2006, 43, 4005-412.

Phillips, "Transferability, Sample Selection Bias and Background Data in Presense-Only Modeling: a response to Peterson et al. (2007)," Ecography 31: 272-278, 2008.

* cited by examiner

SYSTEMS, DEVICES, AND/OR METHODS FOR MANAGING SAMPLE SELECTION BIAS

CROSS-REFERENCE TO RELATED APPLICATION

The present application is a continuation of and claims priority to U.S. patent application Ser. No. 12/342,233, filed on Dec. 23, 2008, which is hereby incorporated by reference in its entirety.

U.S. Pat. No. 7,089,241 (Alspector), which is incorporated by reference herein in its entirety, allegedly discloses that a "probabilistic classifier is used to classify data items in a data stream. The probabilistic classifier is trained, and an initial classification threshold is set, using unique training and evaluation data sets (i.e., data sets that do not contain duplicate data items). Unique data sets are used for training and in setting the initial classification threshold so as to prevent the classifier from being improperly biased as a result of similarity rates in the training and evaluation data sets that do not reflect similarity rates encountered during operation. During operation, information regarding the actual similarity rates of data items in the data stream is obtained and used to adjust the classification threshold such that misclassification costs are minimized given the actual similarity rates." See Abstract.

U.S. Pat. No. 7,046,963 (Luo), which is incorporated by reference herein in its entirety, allegedly discloses that a "methodology of signal estimation over the generalized fading channel can be applied to any parameter whose dB value is required to be estimated. The estimator is shown to be asymptotically efficient in a number of samples and the amount of fading. Theoretical and simulation results confirm that the SINR estimator implemented using the methodology outperforms the sample-average estimator, which is currently used in most of systems and robust to the channel variation." See Abstract.

U.S. Pat. No. 6,920,405 (Lawrence), which is incorporated by reference herein in its entirety, allegedly discloses that a "desired Acceptable Quality Limit (AQL), a desired Key Defect Rate (KDR), a desired power of a sampling plan for items that are manufactured and a desired false alarm rate for the sampling plan are input into a computer. The computer calculates a required sample size to provide the desired AQL, the desired KDR, the desired power of the sampling plan for the items that are manufactured and the desired false alarm rate for the sampling plan. Thus, each of the individual parameters may be independently specified based on the items that are manufactured, desired AQLs, KDRs, power and false alarm rates. Reliance on ANSI/ASQ Z1.9 tables which might best fit a user's desired parameters can be reduced and preferably eliminated. In addition to calculating the required sample size, a decision rule critical value also may be calculated based upon the required sample size to provide the desired AQL, the desired KDR, the desired power and the desired false alarm rate for the sampling plan. Following the calculations, a relationship between sample size, acceptable number of defective items and false alarm rate automatically may be graphically displayed based upon the desired AQL, the desired KDR and the desired power of the sampling plan. The items that are manufactured may then be sampled at the required sample size to obtain samples, and the number of defective items in the samples or other response variables in each of the samples, may be measured. After measuring the response variables, such as the number of defective items, the measured response variable for each of the samples is input into the computer and an estimate of the Quality Level (QL) for the items that are manufactured is calculated, based on the measured response variable for each of the samples." See Abstract.

U.S. Pat. No. 7,301,990 (Jayaraman), which is incorporated by reference herein in its entirety, allegedly discloses "[t]echniques for performing equalization of multiple signals received by a terminal in soft handoff with multiple base stations. The received signal at the terminal is conditioned and digitized to provide a stream of received samples, which is then equalized/filtered with multiple sets of coefficients to provide multiple streams of transmit chip estimates. One set of coefficients is provided for each base station and is used to provide a corresponding stream of transmit chip estimates. The multiple streams of transmit chip estimates are further processed to provide multiple streams of data symbol estimates, one stream of data symbol estimates for each base station. The multiple streams of data symbol estimates are then scaled with multiple scaling factors and combined to provide a stream of combined data symbol estimates. The processing for the multiple base stations may be performed by a single hardware unit in a time division multiplexed manner." See Abstract.

SUMMARY

Certain exemplary embodiments can provide a method that can include, via a special purpose processor, automatically determining an unbiased estimate of a distribution from occurrence data having an occurrence data sample selection bias substantially equivalent to a background data sample selection bias, the occurrence data related to background data, the background data chosen with the background data sample selection bias.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
FIG. 1 is an exemplary plot for a probability of presence for a species.

Certain exemplary embodiments can provide a method that can include, via a special purpose processor, automatically determining an unbiased estimate of a distribution from occurrence data having an occurrence data sample selection bias substantially equivalent to a background data sample selection bias, the occurrence data related to background data, the background data chosen with the background data sample selection bias, the occurrence data representing a physically-measurable variable of one or more physical and tangible objects or substances.

The following indented paragraphs immediately following the present paragraph describe one or more exemplary embodiments and are illustrative and not restrictive in their scope.

Most methods for modeling species distributions from occurrence records require additional data representing the range of environmental conditions in the modeled region. These data, called background or pseudo-absence data, are usually drawn at random from the entire region, whereas occurrence collection is often spatially biased towards easily accessed areas. Since the spatial bias generally results in environmental bias, the difference between occurrence collection and background sampling may lead to inaccurate models. To correct the estimation, we propose choosing background data with the same bias as occurrence data. We investigate theoretical and practical implications of this approach. Accurate information about spatial bias is usually lacking, so explicit sampling of background sites may not be possible. However, it is likely that an entire target group of species observed by similar methods will share similar bias. We explore the use of all occurrences within a target group as biased background data. We compare model performance using target-group background and randomly-sampled background on a comprehensive collection of data for 226 species from diverse regions of the world. We find that target-group background improves average performance for all the modeling methods we consider, with the choice of background data having as large an effect on predictive performance as the choice of modeling method. The performance improvement due to target-group background is greatest when there is strong bias in the target-group presence records. Our approach applies to regression-based modeling methods that have been adapted for use with occurrence data, such as generalized linear or additive models and boosted regression trees, and to Maxent, a probability density estimation method. We argue that increased awareness of the implications of spatial bias in surveys, and possible modeling remedies, will substantially improve predictions of species distributions.

1 Introduction

Species distribution modeling (SDM) is an important tool for both conservation planning and theoretical research on ecological and evolutionary processes. Given sufficient resources, SDM can be based on data gathered according to rigorously defined sampling designs, where both presence and absence of species is recorded at an environmentally and spatially representative selection of sites. However, for most areas of the world and most species, resources are too limited to gather large sets of data including both presences and absences, and furthermore, many species have been extirpated from much of their original range. For these reasons, SDM relies heavily on presence-only data such as occurrence records from museums and herbaria. These occurrence data often exhibit strong spatial bias in survey effort, meaning simply that some sites are more likely to be surveyed than others; such bias is typically spatially autocorrelated, but this paper allows for arbitrary spatial bias. This bias, referred to as sample selection bias or survey bias, can severely impact model quality; however, the effect of such bias has received little attention in the SDM literature. We present a theoretical analysis of sample selection bias for several presence-only SDM methods. We also describe a general approach for coping with biased occurrence data, and empirically test its efficacy.

The range of model types for fitting presence-only data has expanded rapidly over the last decade. In ecology, the most common methods for these data were originally those that fitted envelopes or measured point-to-point similarities in environmental coordinates. These methods use only occurrence data, ignoring the set of environmental conditions available to species in the region. More recent methods achieve better discrimination by modeling suitability relative to the available environment. Information on the available environment is provided by a sample of points from the study region. We refer to these points as background or pseudo-absence data. Examples of specialized programs include Hirzel's ecological niche factor analysis ("ENFA" or "Biomapper") and Stockwell and Peterson's genetic algorithm for rule-set prediction "GARP". More generally, a broad range of logistic regression methods can be adapted to this situation, either in an approximation (modeling presences against background rather than against absences) or with more rigorous statistical procedures that correct for the possibility of true presences appearing in the background data. Because the regression-related methods and other newer initiatives show generally higher predictive performance than other approaches, we focus here on a subset of more successful, widely used methods: boosted regression trees (BRT), maximum entropy, multivariate adaptive regression splines (MARS) and generalized additive (GAM) models.

These methods all require information about the range of environmental conditions in the modeled region, given by background samples. Some modelers think of the background samples as implied absences-partly because the word "pseudo-absences" gives that impression. However, the intention in providing a background sample is not to pretend that the species is absent at the selected sites, but to provide a sample of the set of conditions available to it in the region. The critical step in selection of background data is to develop a clear understanding of the factors shaping the geographic distribution of presence records. Two key elements are the actual distribution of the species, and the distribution of survey effort. Potentially, the latter can be spatially biased, i.e., there may be sample selection bias Most SDMs are fitted in environmental space without consideration of geographic space, so the importance of spatial bias is that it often causes environmental bias in the data. If a spatially biased sample proportionately covered the full range of environments in the region, then it would cause no problem in a model based on environmental data. However, this is usually not the case. If the bias is not accounted for, a fitted model might be closer to a model of survey effort than to a model of the true distribution of the species. For example, a species with a broad geographic distribution might only have been recorded in incidental surveys close to towns and beside roads. Background samples are commonly chosen uniformly at random from the study region; this characterizes the range of environments in the region well, but fails to indicate sample selection bias. If the roadsides and towns are not a random sample of the environment, applying any of the above modeling techniques to these data will produce a model that best describes the differences in the distribution of the presence sites compared to the background data. For example, if roads in this region happen to follow ridges, and if towns happen to be associated with the most fertile soils, then a model will find that ridges and fertile soils are positively correlated with the distribution of the species, whereas in reality they best describe the distribution of roads and towns, and hence survey effort.

The most straightforward approach to address this problem would be to manipulate the occurrence data in order to remove the bias, for example by discarding or down-weighting records in over-sampled regions (e.g., the Debiasing Averages approach) or by surveying under-represented regions. However, such manipulations are hampered by incomplete information about the distribution of survey effort. In addition, the paucity of presence records for many species of interest makes discarding records unpalatable, and resources may not be available to conduct new surveys. The data may also be biased in a way that cannot be "fixed" by collecting new data: if many forested areas have been cleared, new surveys will not provide presence records of forest-dependent species in cleared areas. In the same way, less arid, more fertile areas are more likely to have been transformed by human activity, so new surveys would result in occurrence data that are biased towards arid or infertile areas. In these cases the sample selection bias is an inherent part of the realized, current distribution of the species.

An alternative approach is to manipulate the background data. Whilst some studies explore this idea, the ecological literature lacks a coherent theoretical exploration, and the proposed solutions seem to represent different and probably incompatible reasoning. The approach we propose is to design the selection of background data so they reflect the same sample selection bias as the occurrence data. This aims to achieve the same environmental bias in both data sets. For example, if presence data are only taken from easily surveyed portions of the study region, then background data should be taken from the same areas. The hope is that a model based on biased presence data and background data with the same bias will not focus on the sample selection bias, but will focus on any differentiation between the distribution of the occurrences and that of the background. In other words, if the species occupies particular habitats within the sampled space, the model will highlight these habitats, rather than just areas that are more heavily sampled. This has been justified theoretically for Maxent. In the regression case, we could find no clear treatment of how to understand and interpret models using presence—pseudo absence data, particularly with varying biases in the underlying data, so we present that here. We first investigate how to interpret models produced with random background, using the theory of use-availability sampling in habitat-selection studies. We extend the analysis to biased data, and show that under reasonable conditions, models created using background data with the same sample selection bias as the presence data can be interpreted in the same way as models produced with completely unbiased data.

It can be difficult to create background data with the same bias as presence data since we seldom know the sample selection distribution exactly. As an alternative, if presence records are derived from natural history collections, records for a broad set of species could be used to estimate survey effort. The set of species should be chosen so as to represent the specimen collection or observation activities of collectors of the target species. In general, the groups should contain species that are all collected or observed using the same methods or equipment; such groups of species are called target groups. Broad biological groups (birds, vascular plants etc.) are likely to be suitable. The sites for all records from all species in the target group then make up the full set of available information on survey effort and can be used as background data; we call such a set of sites target-group background.

To measure the effectiveness of target-group background, we compared it to random background using several modeling methods and the same dataset as a recent comprehensive comparison of modeling methods. The dataset covers 226 species from diverse regions of the world, with a wide range of sample sizes (2 to 5822, with a median of 57). The regions exhibit varying amounts of sample selection bias, with Ontario, Canada showing the most striking bias, towards the more populous south. A crucial aspect of this dataset is that it contains independent, well-structured presence-absence test data. The test data were collected independently of the training data, using rigorous surveys in which the species' presence or absence was recorded at a collection of test sites. This allows us to evaluate model performance in a way that is largely unaffected by sample selection bias since the predictive performance of the models is evaluated on this test data, rather than the presence-only training data. We focus on average performance across broad groups of species rather than detailed expert evaluation of individual species models, and compare several of the better-performing methods from the study of Elith. This allows us to determine how sample selection bias impacts performance of presence-only species distribution models on typical datasets, and whether target-group background can effectively counteract sample selection bias on such datasets. Whilst the effect of background sample selection has been mentioned in relation to individual modeling methods, this paper focuses on the general problem and on its relevance across a range of species, environments, and modeling methods.

1.1 The Dangers of Sample Selection Bias: an Example

Figure 2:
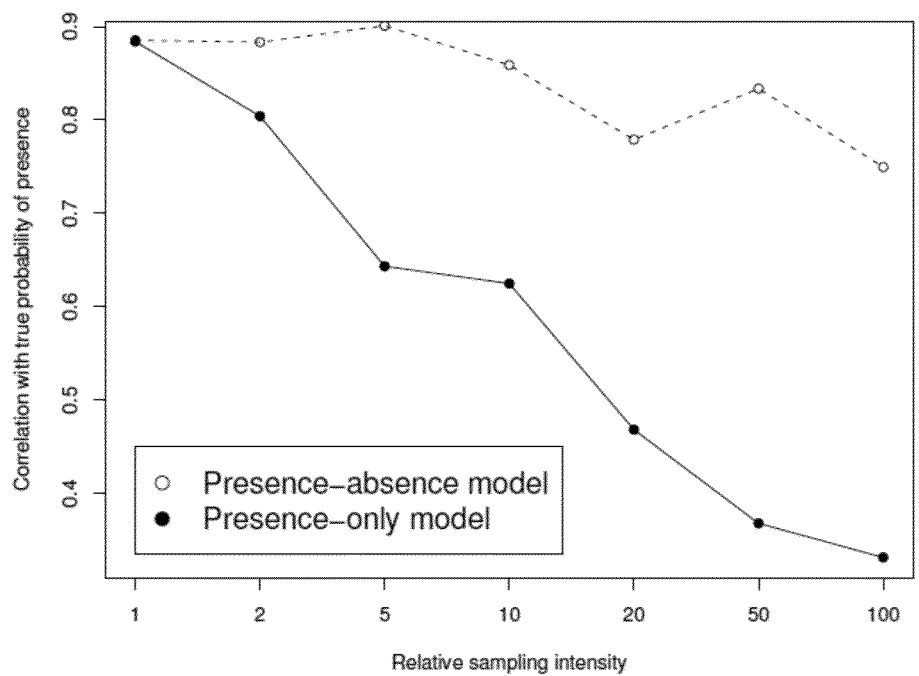
FIG. 2 is an exemplary graph of a correlation between a model output and a true probability of presence.
Figure 3:
FIG. 3 is an exemplary plot for a predicted probability of presence modeled from biased presence-only data.
Figure 4:
FIG. 4 is an exemplary plot for a predicted probability of presence modeled from biased presence/absence data.
Figure 6:
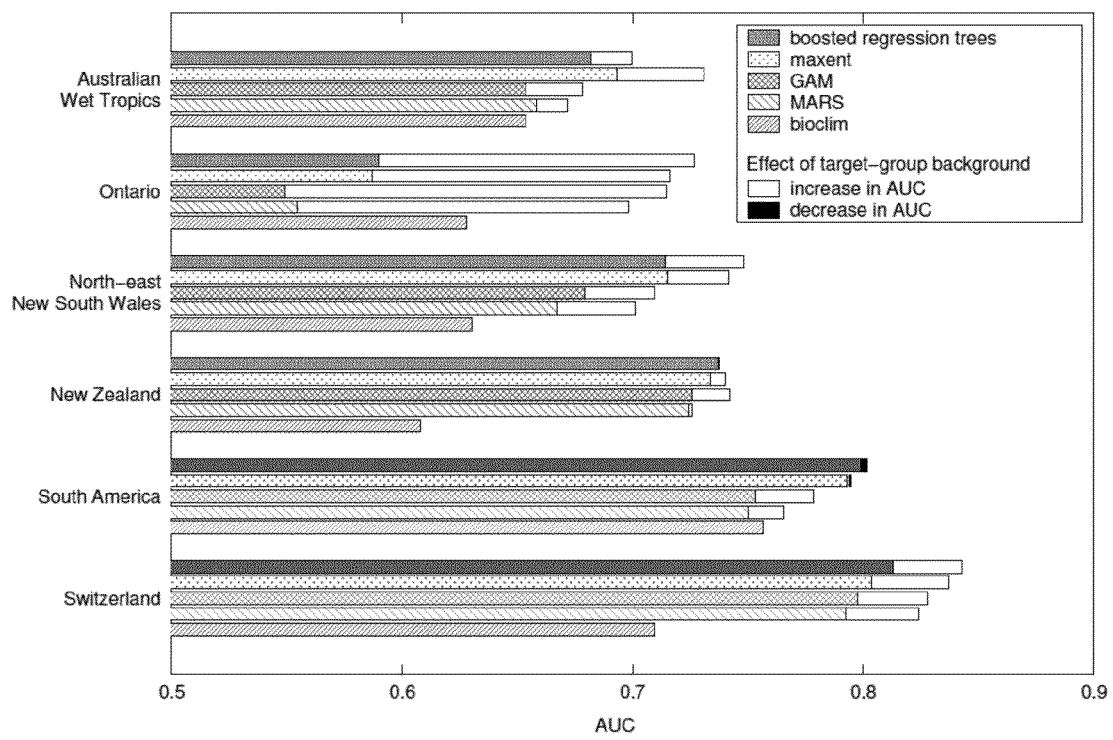
FIG. 6 is an exemplary graph of performance based on independent presence-absence test data.

When presence-absence data are available, there are a number of modeling methods that are known to be resilient to sample selection bias. However, bias can have a powerful effect on models derived from presence-background data; to demonstrate this dichotomy, we briefly consider a synthetic species in Ontario, Canada, and use the continuous environmental variables described in Elith. The probability of presence for the species (FIGS. 1 and 2) is defined to be 1 for any location which is within the middle 40% of the range of all environmental variables. For each variable outside of the middle 40% of its range, the probability of presence is multiplied by a factor ranging linearly from 0.7 (at the extremes of the variable's range) to 1.0 (at the 30th and 70th percentiles). The particular constants used here were chosen for illustrative purposes only, to create a synthetic species with a broad preference for mid-range conditions in all variables. Occurrence data are often biased towards human population centers and roads. Therefore, roughly following the human population and road density of Ontario, we modeled sample selection bias with a sampling distribution that is uniform in the southern 25% of Ontario, uniform with b times lower intensity in the northern 50% of the province, and a linear transition of sampling intensity in between; we varied b between 1 (unbiased sampling) and 100 (strongly biased sampling). Several predictor variables for Ontario have a strong north-south trend, so this spatial bias will translate into a bias in predictor space. Samples were generated by repeatedly picking a site according to this sampling distribution and then randomly labeling the site either as a presence (with probability equal to the species' probability of presence there) or absence (with the remaining probability). Sampling continued until there were exactly 200 presences. Thus a full dataset for each value of b contained 200 presences and a variable number of absences, depending on how many were selected in creating the set of 200 presences. Two boosted regression tree models were then created: one with the set of presences and absences, and a second with the 200 presences together with 10000 background samples chosen uniformly at random from the region, and weighted so that presence and background have equal weight, as in Elith. We used 10000 samples as this is large enough to accurately represent the range of environmental conditions in the study region; more background samples do not improve model performance. The presence-absence models are highly correlated with true probability of presence, even under severe sample selection bias (b=100). This happens because BRT is a "local" learner, so the model generated with biased training data converges asymptotically to the unbiased model (for large sample sizes) as long as two conditions hold: sampling probability is non-zero in the whole region, and sampling is conditionally independent of species presence given the environmental conditions. In contrast, for the presence-only models, correlation with true probability of presence quickly drops as sample selection bias increases (FIGS. 1 and 2). For b=50, the presence-absence model is visibly similar to true probability of presence, while the presence-only model appears only weakly related (FIGS. 3 and 4). We note that the strong sample selection bias depicted in FIGS. 3 and 4 may actually be very moderate compared to true occurrence data, where sampling intensity can vary by a factor of tens of thousands (FIG. 6).

2 Models and Analysis 2.1 Preliminaries

In the analyses that follow, we consider an area with a total of N sites. For each site t, there are v known covariates (measured environmental variables) denoted by $x=(x_1, \ldots, x_v)$. An observation (t, y) records whether at a particular time the species is present (y=1) or absent (y=0) at the site t. This treatment allows for the possibility that a species is present at a given site during one observation and absent in the next, as may happen for vagile species. The probability that the species is present at a site t, denoted $P(y=1|t)$, may therefore lie somewhere between 0 and 1. Formally, observations are taken from a distribution over a sample space consisting of pairs (t,y), where t is a site and y is the response variable. We will use P to denote probability under spatially unbiased sampling from this sample space, i.e., each site has equal probability (1/N) of being sampled. For example, the prevalence of the species, denoted $P(y=1)$, is the fraction of sites at which the species is present (for perfectly detectable non-vagile species), or the probability of observing the species at a randomly-chosen site (for perfectly detectable vagile species). A collection of observations is unbiased in environmental space if it samples each combination of environmental covariates proportionately to the amount of the study area that has those covariate values. Therefore, observations that are spatially unbiased are also environmentally unbiased, though the converse is not always true.

2.2 Modeling Methods

The modeling methods considered here use two distinct approaches for presence-only modeling. The first approach is derived from regression techniques, which are normally applied to presence-absence modeling. These methods estimate probability of presence from training data consisting of presences and absences for a given species. They have been adapted for use with presence-only data by treating the background data as if it were absence data. They are all logistic methods, modeling probability of presence as $P(y=1|x)=\exp(f(x))/(1+\exp(f(x)))$ for some function $f$ of the environmental variables, and they differ mainly in the form of the function $f$. We used the following presence-absence methods:

Generalized additive models (GAM) use non-parametric, data-defined smoothers to fit non-linear functions.

Multivariate adaptive regression splines (MARS) provide an alternative regression-based technique for fitting non-linear responses. MARS uses piecewise linear fits rather than smooth functions and a fitting procedure that makes it much faster to implement than GAM.

Boosted regression trees (BRT), also known as stochastic gradient boosting, use a form of forward stagewise regression to construct a sum of regression trees. Each stage consists of a gradient-descent step, in which a regression tree is fitted to the derivatives of the loss function. Cross-validation is used to avoid overfitting by halting model growth based on predictive accuracy on withheld portions of the data.

The second approach is probability density estimation, where the presence data are assumed to be drawn from some probability distribution over the study region. The task is to estimate that distribution. This approach is represented here by a single method, called Maxent, described below. Whenever we present examples, we use either BRT or Maxent, since these are the two methods out of those considered here that performed best in the comparison of methods by Elith. The settings used for BRT have been improved over those used previously and we use a recent version of Maxent (Version 3.0) with default settings. For both methods, therefore, the statistical performance we report for random background is improved over that presented by Elith.

2.3 Presence-absence Models with Random Background

Before we analyze the use of presence-absence models (such as BRT, GAM and MARS) on presence-background data under bias, we must first understand the use of these methods on unbiased data. Using unbiased presence data and random background gives a sample model known in habitat-selection studies as a use-availability sampling design, and defined as follows. The full set of training data consists of a set of samples, each obtained either by randomly choosing a sample with y=1 to get a presence sample (a fraction p of the whole set), or randomly choosing a sample from the full set of N sites to get a background sample (the remaining fraction 1−p). This sampling model suffers from two complications. First, the set of background samples typically includes both sites with y=1 and sites with y=0, a problem referred to as contaminated controls. Second, the sampling intensity (probability that a given data point will be chosen as a sample) may differ between presence and background samples, which makes it a case-control sampling design. The relative sampling intensity is determined by the parameter p. Our goal in this section is to understand the effect of these two complications, and in particular, to determine exactly what quantity is being estimated when a model is fitted to use-availability data.

For mathematical simplicity in our analyses, we use two steps to model the process by which each training sample is derived. The first step is a random decision about whether the current sample will be presence (probability p) or background (probability 1−p). The second step is a random draw either from the population of presences or from the full set of available sites, according to the outcome of the first step. We will use $P_{UA}$ to denote probability under this sampling model. $P_{UA}$ is formally defined as a joint probability model over triples (t, y, s) where s is an auxiliary variable representing sampling stratum: s=1 for presence samples and s=0 for background samples. Therefore, $P_{UA}(s=1)=p$ and $P_{UA}(s=0)=1-p$, and by definition, $$P_{UA}(x|s=1)=P(x|y=1) \text{ and } P_{UA}(x|s=0)=P(x). \quad \text{(Equation 1)}$$

When a presence-absence model is applied to use-availability data, the response variable being modeled is s, not y, so we obtain an estimate of $P_{UA}(s=1|x)$, i.e., the probability that a site will be chosen as a presence sample rather than a background sample, conditioned on the environmental variables. It is crucial to note that this is not the same as $P(y=1|x)$, the probability of occurrence conditioned on the environmental variables. Indeed, if we define $$r = \frac{(1-p)}{p}P(y=1)$$

then we obtain the following relationship, similar to Eq. (11) of Keating and Cherry, but without their large-sample assumption:

$$P_{UA}(s=1/x) = \frac{1}{1+r(y=1/x)} \quad \text{(Equation 2)}$$

This relationship is proved as follows:

$$P_{UA}(s=1/x) = P_{UA}(x|s=1)P_{UA}(s=1)/P_{UA}(x). \quad \text{(Bayes' rule)}$$

$$= \frac{P_{UA}(x|s=1)P_{UA}(s=1)}{P_{UA}(x|s=1)P_{UA}(s=1) + P_{UA}(x|s=0)P_{UA}(s=0)} \quad \text{(since } s=0 \text{ or } 1\text{)}$$

$$= \frac{pP_{UA}(x|s=1)}{pP_{UA}(x|s=1) + (1-p) + P_{UA}(x|s=0)} \quad \text{(definition of } p\text{)}$$

$$= 1/(1+a) \quad \text{(dividing through by } p \; P_{UA}(x|s-1)\text{)}$$

where a satisfies:

$$a = \frac{(1-p)}{p}\frac{P_{UA}(x|s=0)}{P_{UA}(x|s=1)}$$

$$= \frac{(1-p)}{p}\frac{P(x)}{P(x/y=1)} \quad \text{(by Eqn. 1)}$$

$$= \frac{(1-p)}{p}\frac{P(y=1)}{P(y=1|x)} \quad \text{(Bayes' rule)}$$

$$= r/P(y=1x).$$

This has strong implications for interpretation of any model fitted to presence-background data using a presence-absence method, as the quantity being approximated is not equal to, or even proportional to, probability of presence. Despite these problems, this sampling model and the resulting estimate of $P_{UA}(s=1/x)$ have been extensively used in SDM. Using an estimate of $P_{UA}(s=1/x)$ for species modeling is reasonable as long as care is taken in the interpretation of model values. While $P_{UA}(s=1/x)$ is not proportional to probability of presence, it is a monotone increasing function of probability of presence, i.e., it correctly ranks probability of presence. In particular, this means that any binary prediction made by thresholding $P(y=1|x)$ (i.e., predicting presence only for sites with $P(y=1|x)$ above some threshold) can be obtained by thresholding $P_{UA}(s=1/x)$, and vice versa, although the required thresholds will differ. When measuring model performance, measures that depend only on ranking of test data (such as the area under the receiver operating characteristic curve) might therefore be insensitive to the distinction between modeling $P_{UA}(s=1/x)$ or $P(y=1|x)$, although the two approaches will likely yield different models.

In habitat-selection studies using resource selection functions, the emphasis is on deriving $P(y=1|x)$ from $P_{UA}(s=1/x)$ by inverting Eqn. 2. If $P(y=1|x)$ is assumed to be an exponential function, then $PP_{UA}(s=1/x)$ is logistic. A logistic model fitted to $P_{UA}(s=1/x)$ can thus be used to infer parameters of an exponential model for $P(y=1|x)$. However, this approach is controversial in the habitat-selection literature Keating and Cherry. An alternative way of estimating $P(y=1|x)$ from presence-only data involves using the expectation-maximization (EM) algorithm to iteratively infer probability of occurrence for the background sites (estimation) and feed the results back into maximum likelihood parameter estimation (maximization). Whilst this approach has strong theoretical justification, it requires knowledge of $P(y=1)$, and the implementation is not yet widely available, so we do not use it here. In summary, modeling $P_{UA}(s=1/x)$ is the best currently available way to apply presence-absence models to presence-only data, and is therefore the approach we take here.

2.4 Presence-absence Models with Biased Background

We have argued that sample selection bias is widespread in species occurrence data. We would therefore like to be able to correct for this bias. As in the unbiased case we cannot estimate $P(y=1|x)$ without further knowledge of the prevalence $P(y=1)$. Instead, we prove under a mild assumption that if the background data have the same bias as the occurrence data, the resulting model is monotonically related to $P(y=1|x)$, as in the unbiased case. We therefore assume that both background and presence samples are selected non-uniformly using the same sample selection distribution. A practical example could be that presence records are collected by driving along roads while stopping at random sites and walking up to 100 m from the road to record sightings of the species. This sample selection is biased towards roadsides, which in turn are likely to be biased away from gullies or particular rough terrain. To generate background data with the same bias, we randomly select sites within a distance of 100 m from any road (note that these might coincide with presence points). For this example, the sample selection distribution is uniform over sites whose distance from the road is at most 100 m, and zero elsewhere. We introduce an additional auxiliary variable b to represent potentially biased selection of samples: samples are now drawn from a distribution over triples (t,y,b), and only samples with b=1 are used for model training. Analogously to the unbiased case, a presence-absence model fitted to a biased use-availability sample gives an estimate of $P_{UA}(s=1/x, b=1)$. The derivation of Eqn. 2 is still valid if we condition all probabilities on b=1, so Eqn. 2 generalizes to:

$$P_{UA}(s=1/x, b=1) = \frac{1}{1+r'/P(y=1|x, b=1)} \quad \text{(Equation 3)}$$

Where $r' = \frac{(1-p)}{p}P(y-1/b=1)$, which is a constant independent of x.

In many cases we can make the assumption that $P(y=1|x, b=1) = P(y=1|x)$, i.e., that sampling effort and presence of the species are conditionally independent given x. Under this assumption, the right-hand side of Eqn. 3 simplifies to $1/(1+r'P(y=1|x))$. Thus, the function we are fitting, $P_{UA}(s=1|x, b=1)$, is monotonically related to what we are truly interested in, $P(y=1|x)$. A simple case for which the conditional independence assumption is true is when all variables that affect presence of the species are included among the covariates. Similarly, we obtain conditional independence if all variables that affect sample selection are included among the covariates. In general, though, conditional independence may not hold. For example, a pioneer plant species that is correlated with disturbance may be more common than climatic conditions would suggest near roads and towns, exactly where sample selection bias is higher. Unless disturbance level is used as a predictor variable, the conditional independence assumption would be incorrect.

2.5 Maxent Models with Unbiased Samples

Maxent is a general technique for estimating a probability distribution from incomplete information. It has been applied to species distribution modeling by assuming that the presence data have been drawn from some probability distribution π over the study region, and using the presence records for a species to determine a set of constraints that are likely to be satisfied by π. Maxent then produces as output the distribution of maximum entropy among all distributions satisfying those constraints; note that the distribution is over sites in the study region, not over environmental conditions. The constraints require that the expected value of each environmental variable (or some functions thereof, referred to as features) under this estimated distribution closely match its empirical average. Maximizing entropy is desirable, as doing otherwise would be equivalent to imposing additional (unfounded) constraints on the output distribution. Maximizing entropy also has the useful property that it results in a distribution with a simple mathematical description: under the Maxent distribution, the probability of a site is an exponential function of the features.

The Maxent distribution can be related to conditional probability of presence as follows. The probability n(t) is the probability of the site t conditioned on the species being present, i.e., the conditional probability P(t|y=1). We define $$f(x) = \frac{P(x/y=1)}{NP(x)}$$

i.e., $f(x)$ is the average of n(t) over sites with x(t)=x. This gives:

$$P(y=1|x) = \frac{P(y=1)}{P(x)}P(x/y=1) \quad \text{(Bayes' rule)}$$
$$= Nf(x)P(y=1) \quad \text{(definition of } f\text{)}$$

The function $f(x)$ is therefore proportional to probability of presence, and the exponential function describing the Maxent distribution is an estimate of $f(x)$. Note, however, that with presence-only data we typically do not know the constant of proportionality $P(y=1)$, i.e., the prevalence of the species, since $P(y=1)$ is not estimable from presence-only data alone.

2.6 Maxent Models for Biased Samples

Maxent has been available now for 5 years as a standalone program that enables the spatial modeling of presence-only data. Because such data are often biased, the authors have worked on methods for dealing with sample bias, one of which, called FactorBiasOut, we briefly describe here. To describe the impact of sample selection bias on density estimation, we introduce the notation $P_1P_2$ for the site-wise product of two probability distributions normalized over the study region, i.e., $p_1p_2(t) = p_1(t) p_2(t)/\Sigma_{t'}p_1(t')p_2(t')$. As opposed to the case of unbiased estimation, we now assume that the presence sites for a species are biased by a sample selection distribution σ, in other words, the presence sites are recorded by observers who pick locations randomly according to σ, rather than uniformly at random. The presence sites are therefore samples from the distribution σπ rather than from the true species distribution π.

The FactorBiasOut method estimates σπ, then factors out the bias σ. It does this by outputting the distribution that minimizes the relative entropy RE(σq||σ) among all choices of the probability distribution q, subject to the constraints mentioned in Section 2.5, with the constraints now applying to σq, since that is the distribution from which we have samples. Relative entropy, also known as Kullback-Liebler (KL) divergence, measures how different two probability distributions are. It makes sense to seek to minimize the difference from σ, since a null model would have the species distribution being uniform, so the presence data would simply be drawn from σ.

In the special case that there is no sample selection bias, i.e., σ is the uniform distribution, FactorBiasOut is just the standard Maxent, since minimizing entropy relative to the uniform distribution is the same as maximizing entropy. Under reasonable conditions, the output of FactorBiasOut converges, with increasing sample size, to the distribution q that minimizes RE(σπ||σq) among the class of Gibbs (i.e., exponential) distributions. This generalizes the result for the unbiased case, that the output of Maxent converges to the Gibbs distribution that minimizes RE(π||q). In other words, the output of FactorBiasOut converges to a distribution that is close, in a strict sense and as in the unbiased case, to the true distribution π, so bias has been removed from the prediction.

As described so far, the FactorBiasOut method requires knowledge of the sampling distribution σ. However, it is enough to have a set S of independent samples from σ. We can use S as background data for fitting a Maxent distribution and then apply the resulting model to obtain a distribution over the entire study area. For large |S|, the resulting distribution converges to the same distribution q. To summarize, we have shown that, as with the regression models, using background data with the same sample selection bias as the occurrence data yields a Maxent model with theoretical properties that are analogous to the unbiased case.

3 Experimental Methods 3.1 Data Sources

We used data for 226 species from six regions of the world: the Australian Wet Tropics (AWT), Ontario, Canada (CAN), north-east New South Wales, Australia (NSW), New Zealand (NZ), South America (SA) and Switzerland (SWI). The species represent a range of geographic distributions, habitat specialization and biological groups/life forms. Similarly, there is a wide range in the amount of training data per species (2-5822 occurrence records, median 57). In the independent evaluation data, the presence or absence of each species is described at between 102 and 19120 sites. There are 11 to 13 environmental data layers per region, and the layers are typical of what is used for SDM. Environmental data varied in functional relevance to the species and spatial resolution.

Data for three regions (NSW, NZ, SWI) had more direct links to species' ecology at the local scale than the climate-dominated variables from AWT, CAN and SA. Layers from AWT, NSW, NZ and SWI had grid cell sizes of around 100 m and those from CAN and SA were 1 km More details on the species and environmental data layers can be found in Elith.

3.2 Background Treatments

Two sets of background data were used. First, we used 10000 sites selected uniformly at random from each region (as in Elith, and referred to as random background). Second, and uniquely for this study, for each of the 226 species we generated a set of background data consisting of the presence localities for all species in the same target group (referred to as target-group background). The target groups were birds or herpetofauna for AWT; birds for CAN, plants, birds, mammals or reptiles for NSW; and plants for NZ, SA and SWI (Table 1).

3.3 Evaluation Statistics

The modeled distributions were evaluated for predictive performance using the independent presence/absence sites described above. We used the area under the receiver operating-characteristic curve (AUC) to assess the agreement between the presence-absence sites and the model predictions. The AUC is the probability that the model correctly ranks a random presence site versus a random absence site, i.e., the probability that it scores the presence site higher than the absence site. It is thus dependent only on the ranking of test data by the model. It provides an indication of the usefulness of a model for prioritizing areas in terms of their relative importance as habitat for a particular species. AUC ranges from 0 to 1, where a score of 1 indicates perfect discrimination, a score of 0.5 implies random predictive discrimination, and values less than 0.5 indicate performance worse than random.

When we are working with presence-only data, we can define the AUC of a model on a set of presence sites relative to random background as the probability that the model scores a random presence site higher than a random site from the study area. The resulting AUC measures the model's ability to distinguish test sites from random, but the value of the AUC is harder to interpret than in the presence-absence case. While a score of 0.5 still indicates discrimination that is no better than random, the maximum value attainable is typically less than 1.

The correlation, COR, between a prediction and 0-1 observations in the presence-absence test dataset is known as the point biserial correlation, and can be calculated as a Pearson correlation coefficient. It differs from AUC in that, rather than depending only on rank, it measures the degree to which prediction varies linearly with the observation. Because it depends on the prediction values rather than simply on their order, it is likely to be sensitive to the effect of varying relative sampling intensity in the training data (Equation 2, Section 2.3).

To assess whether there is a monotone relationship between two variables, we use Spearman's rank correlation coefficient (p), which is a non-parametric measure of correlation. We use p rather than Pearson's product-moment correlation (r) to avoid two assumptions required by the latter: that the relationship between the two variables is linear, and that the data are drawn from normal distributions.

3.4 Measuring Bias

Figure 5:
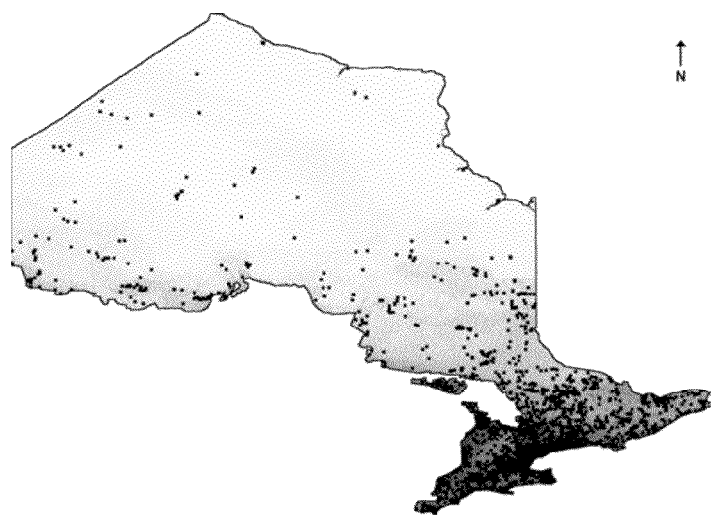
FIG. 5 is an exemplary plot of bias in training data.

In order to measure the effect of bias on predictions, it is useful to be able to measure the amount of bias in a set of presence-only samples. Specifically, we would like to measure the amount of bias for each target group. We do this by estimating how well we can discriminate target-group sites from the background, by using Maxent to make a model of target group sites and using the AUC of the target-group sites versus background as a measure of discrimination. We refer to this value as $AUC_{TG}$. If $AUC_{TG}$ is high, it means that the environmental variables can be used to distinguish the spatial distribution of target-group presences from random background, and therefore target group presences sample environmental space in very different proportions from the proportions present in the study area, i.e., the target group presences are biased both in environmental and geographic space. We therefore use $AUC_{TG}$ as an estimate of sample selection bias for the target group, but with the following two reservations. First, spatial bias will only be picked up by $AUC_{TG}$ if it results in bias in environmental space, i.e., if some environmental conditions are more strongly represented in the target-group presence data than we would expect based on the proportion of sites with those conditions. Any spatial bias that is independent of the environmental variables will not be picked up by $AUC_{TG}$. However, such spatial bias is less problematic than the bias measured by $AUC_{TG}$, since a species distribution model cannot use it to distinguish presences from background. Second, the target group may truly occupy only part of the environmental space represented in the study area, in which case $AUC_{TG}$ may be higher than 0.5 even if there is no sample selection bias, i.e. even if the presence records were gathered with uniform survey effort across the study area. For these reasons, $AUC_{TG}$ should be interpreted carefully only as an estimate of bias. Note also that the use of Maxent models here is not essential; any of the methods used in this paper would have sufficed. Once we have an estimate of bias in the training data, it is possible to measure how well this bias estimate predicts sampling effort in the evaluation data. A simple systematic design for evaluation data would uniformly sample the study region, and therefore have no bias. However, bias may arise, for example if the evaluation data derive from a survey of only part of the region, such as all uncleared, forested areas. If the sample selection and evaluation biases are similar, we might expect it would help us in constructing better-performing models. We measure the similarity of the biases using the value $AUC_{eval}$, defined as the AUC of the Maxent model of training group sites, with the AUC evaluated using test sites (both presences and absences) versus random background. A high value of $AUC_{eval}$ indicates that environmental conditions at the test sites are very similar to those at the training sites, and different from most of the study region. The amount of bias varied considerably between regions and target groups (Table 1), with the strongest bias and the highest value of $AUC_{eval}$ occurring in Canada (FIG. 5). AWT-plant training data were least effective at predicting test sites (AUCeval=0.5649).

4 Results

Figure 7:
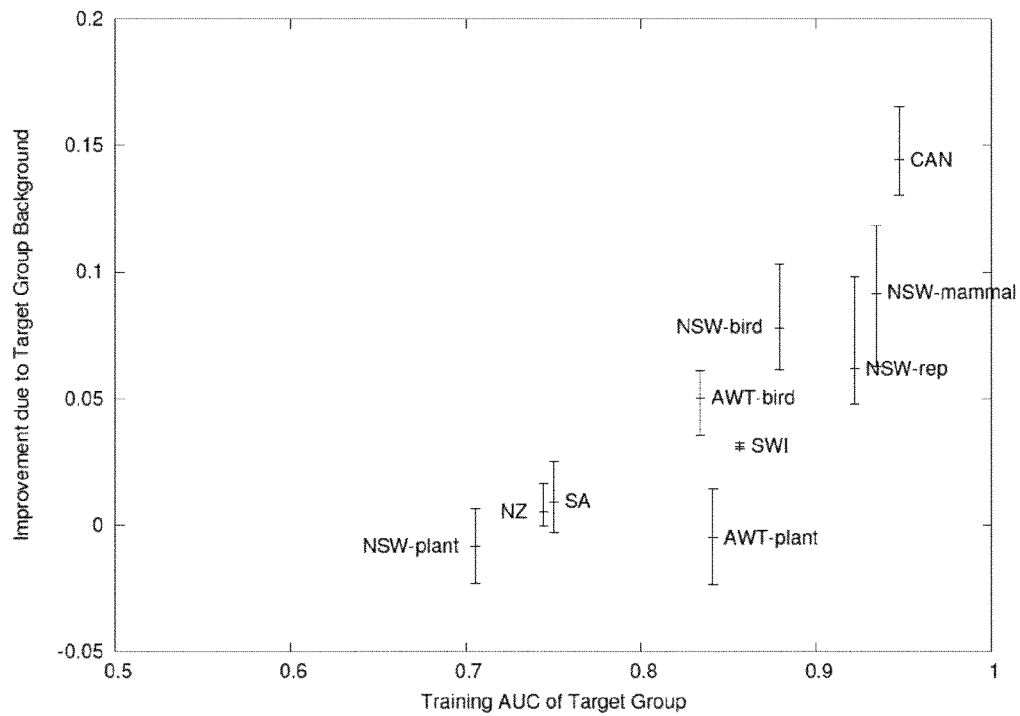
FIG. 7 is an exemplary graph of improvement in AUC on independent presence-absence test data when using target-group background instead of random background.
Figure 8:
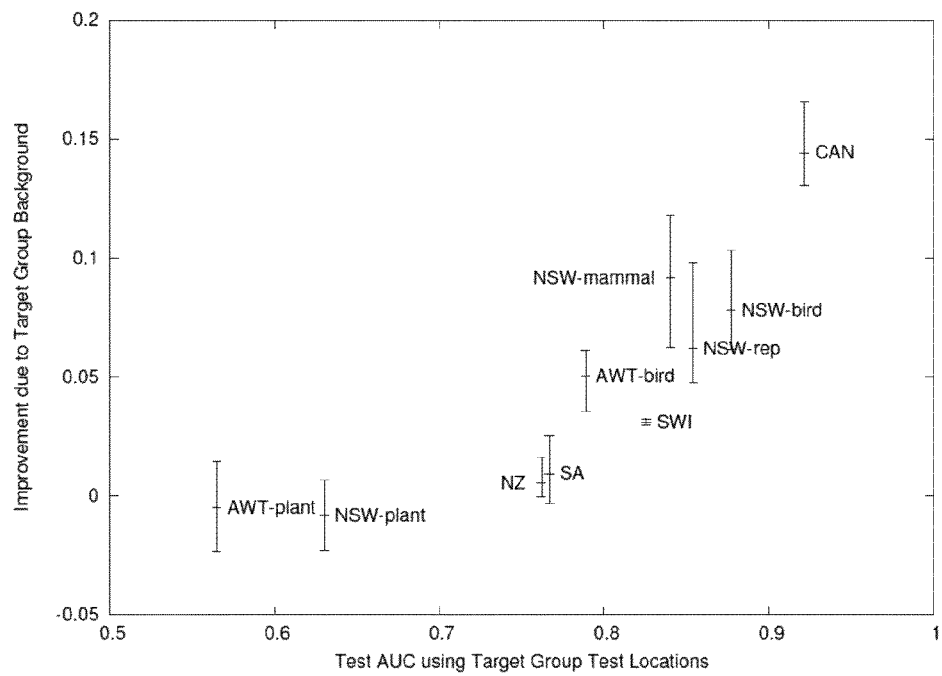
FIG. 8 is an exemplary graph of improvement in AUC on independent presence-absence test data when using target-group background instead of random background.

The average AUC and COR values improved for all methods when using target-group background (Table 2). The improvement in each statistic was highly significant for all methods (p<0.001, two-tailed Wilcoxon signed rank test, paired by species). According to an analysis of variance, the three factors affecting AUC and COR (species, background and algorithm) are all highly significant ((p<10, F-test), with the strongest effect being for species. The effect of background is slightly greater than that of algorithm for both AUC and COR (Table 3). With target-group background, the best methods achieved average AUC values above 0.7 in all regions (FIG. 6). The improvement in AUC scores depended strongly on the estimated amount of bias in training data for the target group (FIG. 7) and with the degree to which the distribution of training data can be used to predict test sites (FIG. 8). For all four methods, there was a strong monotone dependence of improvement in AUC on both estimates of bias as measured by Spearman's rank correlation coefficient (Table 4), with a high level of statistical significance in all cases.

Figure 9:
FIG. 9 is an exemplary plot of Maxent predictions created without use of target-group background.
Figure 10:
FIG. 10 is an exemplary plot of Maxent predictions created with use of target-group background.

Using target-group background has a visually marked effect on some predictions. The greatest improvement in AUC was for a Canadian species, the golden crowned kinglet Ña generalist species that is widely distributed across Ontario and that favors old conifer stands. For this species, the AUC rose from 0.3379 to 0.8412 for Maxent and from 0.2920 to 0.8648 for BRT; the predictions with and without target-group background are very different (FIGS. 9 and 10). The model with target-group background is much more widespread, excluding mostly the southernmost tip of Ontario which is the only part of the province that is predominantly deciduous. The map produced with target-group background is much closer visually to maps of breeding evidence and relative abundance for this species, differing mainly by strongly predicting the far north-east of the province, where there is little current evidence of breeding.

5 Discussion

For all the algorithms we consider here, using target-group background gave a substantial improvement in model performance, measured by both AUC and COR (Table 2). To evaluate the extent of the improvement, we would like to know how it compares with the differences between modeling methods. Elith found that presence-only modeling methods fell into three distinct groups. The lower group consisted largely of methods that do not use background data, such as BIOCLIM. The middle group contained traditional regression-based methods such as GAM and MARS among others, while the top group included Maxent and BRT. The improvement due to target-group background (Table 2) is similar to the difference between groups in Elith. In fact, an analysis of variance shows the effect of background type as being larger than the effect of modeling method (Table 3). We conclude that appropriate choice of background data affects model performance for the four methods presented here as much as the choice of modeling method. Since all tested methods benefit from appropriate background, we recommend both well-informed selection of method and careful choice of background samples. The improvement varied considerably between target groups, with the largest gains seen for target groups with the most biased training data (FIG. 7). This addresses an anomaly from Elith, where BIOCLIM was one of the worst methods in all regions except Canada, where it was one of the best. With target-group background, all the methods considered in this paper perform better than BIOCLIM in all regions. This confirms that the previous anomalous results in Canada were due to a strong bias in the occurrence data impacting the performance of any method that used background data. With target-group background, performance of the methods that use background data is now consistent across regions (FIG. 6, compare with FIG. 5 of Elith).

The effect of target-group background varies species by species, and one might expect that it would be systematically affected by characteristics of a species distribution, in particular the species' prevalence in the study area. We investigated this question, measuring the prevalence of a species as the fraction of test sites in which the species is present. However, we found no clear patterns. For BRT, the improvement in AUC is slightly larger for generalist species (those with high prevalence), while the improvement in COR is slightly larger for specialists (with low prevalence). In contrast, for Maxent, the improvement in AUC was unaffected by prevalence, while COR values improved more for generalists. Details are omitted, since the results were inconclusive. Note that target-group background substantially improved predictions in Switzerland (FIG. 7), and the improvement is statistically significant for all methods ($p<0.001$, two-tailed Wilcoxon signed rank test, paired by species). This is initially surprising, since the presence-only training dataset is extensive and of high quality. However, the sites only sample a subset of the country (forested areas) and therefore they do not represent areas that could support forest but are not currently forested. This means that use of random pseudo-absences misled the models to some extent. The only region where target-group background reduced average performance was South America, for BRT and Maxent, but the decrease is small and not statistically significant ($p>0.65$ for BRT, $p>0.84$ for Maxent, two-tailed Wilcox on signed rank test, paired by species).

When using random background, all the modeling methods we consider will make predictions that are biased towards areas that have been more intensively sampled. In comparison, target-group background removes some of this bias, spreading predictions into unsampled areas with similar environmental conditions to sampled areas where the species is present. The test sites for most of our target groups exhibit similar spatial distributions to the training sites, and therefore target-group background will cause prediction strength (i.e., model output values) to decrease at test sites relative to less-sampled areas, compared with random background. Thus, it is crucial that our test data are presence-absence data, so that we are measuring discrimination at test sites, rather than comparing them to random background. If the test data were presence-only, environmental bias in conditions attest sites would strongly influence test results. For example, the Maxent models trained with target-group background have much lower AUC (0.7168) than models trained with random background (0.8201) if the AUC in both cases is measured using presences at test sites relative to random background, rather than relative to absences at test sites. The use of presence-only evaluation data may explain why Lutolf found that an approach similar to target-group background decreased GLM model performance.

One concern with using target-group background is that we are focusing only on parts of geographic (and thus environmental) space that contain presence samples. Predictions to unsampled areas could therefore be less reliable. This effect is not evident in our statistical results: the average AUC for the groups NSW-plant and AWT-plant, whose test sites are not well predicted by the distribution of training sites, barely changes when using target-group background (FIG. 8). Nevertheless, predictions into unsampled areas, especially those with conditions outside the range observed in sampled areas, should be treated with strong caution. We also note that a critical assumption of the target-group approach is that the data for all species in the group were collected using the same methods, so that the target-group occurrences represent an estimate of sampling effort that is applicable for each member of the group. The set of species in the target group should be chosen with this in mind. The evaluation data we have used here measure model performance according to the ability to predict the realized distribution of a species, as represented by presence-absence data at test sites. We note that many applications of species distribution models depend on predicting potential distributions, rather than realized distributions. A species may have failed to disperse due to geographic barriers, or be excluded from an area due to competition. In the current evaluation prediction into such areas would be penalized; however we note that it is usually not possible, with either occurrence or presence-absence data, to test ability to predict potential distribution. It is possible that some of the species considered here are absent from significant portions of their potential distribution, so our conclusions refer to the ability of models to predict realized distributions. We note also that the present study concerns the ability to derive accurate models in a single geographic area under fixed climatic conditions. Therefore, our conclusions do not necessarily apply to uses of species distribution models involving extrapolation, i.e., producing a model using one set of environmental variables and then applying it to another set with the same names, but describing conditions for a different time or geographic area. Examples of such extrapolations involve future climate conditions or areas at risk for species invasions.

5.1 Alternate Explanations

We have assumed so far that the improvement in performance due to target-group background is due to properly accounting for sample selection bias in the training data. Here we consider other explanations for the performance improvement.

5.1.1 Factoring in the Test Site Bias

When modeling a species distribution, we may be more interested in model performance under some conditions than others, in particular, under conditions that are broadly suitable for the species or target group. For example, if we want a model to predict the specific niche of a montane species within an alpine area, in a broad region that includes a lot of lowland, we should make sure that all different montane conditions are represented in the evaluation data. However, if we were to include a number of lowland sites in proportion to lowland area, our evaluation statistics would not tell us much about the quality of prediction in the alpine area, since a high AUC value can be obtained by simply ranking montane areas higher than lowlands. In general, evaluation data should be chosen in a way that is relevant to the required output and use of the models, and so may focus on restricted areas.

In the case that evaluation data are biased towards areas representing only a subset of environmental conditions, we expect better performance if training data have the same bias, so that model development is focused on the environmental conditions that will be examined during model evaluation. This can be done formally, for example by transductive learning where unlabeled test data are used to reweight training data. It is possible, therefore, that the reason that target-group background improves model performance is that it focuses training on the most important areas of the region, which are also the areas with the most test data.

For presence-only modeling, training sites for a target group will be drawn from broadly suitable areas for the group. The distributions of target-group sites and test sites may therefore be similar, in which case using target-group background brings the spatial distribution of the full complement of training data (presences plus background) closer to that of the test data. To see formally why this is advantageous, consider the case of Maxent. Assume the true species distribution is it and the sampling distribution is $\sigma$. When using FactorBiasOut, the output converges to the distribution $q_o^*$; which minimizes $RE(\sigma\pi \| \sigma q)$ among Gibbs distributions q (Section 2.6). We can expect that $q_o^*$ is close to $q^*$, the distribution that minimizes $RE(it\|q)$, but it is not always true that $q_o^*=q^*$. To obtain the best test results, we would like the Maxent distribution to approximate $\pi$ with respect to the distribution of test data, i.e., we should find $q_{test}^*$ that minimizes $|RE(\sigma test\pi \| \sigma testq)^{|RE(\sigma test\pi\|\sigma testq)}$ as a function of q. If $\sigma=\sigma_{test}$, this is exactly what FactorBiasOut does, and what target-group background approximates. Otherwise, we must rely on the assumption that and $q_o^*$ and $q_{test}^*$ are similar.

For the presence-absence methods, the reasoning is similar. If test sites are chosen according to the distribution $\sigma_{test}$, then we are evaluating how well our predictions model probability of occurrence under $\sigma_{test}$, i.e. $P\sigma_{test}$ (y=1/x). From Section 2.4, we know that presence-absence methods applied to presence-only data and background data with the same bias are approximating a monotonic function of $P_o$ (y=1/x). Therefore the best we can hope for is $\sigma=\sigma_{test}$; otherwise we must rely on the assumption that $P_o$ (y=1/x) and $P\sigma_{test}$ (y=1/x) are similar.

Testing on similar conditions to those encountered during training has the potential to increase estimates of model performance, in addition to the improvement given by properly accounting for sample selection bias in the training data. Indeed, this seems to be the case for the regression-based methods (BRT, GAM and MARS): note the higher correlation of performance with test bias than with training bias in Table 4. In contrast, for Maxent the correlation decreases somewhat, and we conclude that for this dataset, properly dealing with training bias is a sufficient explanation of the performance improvement for Maxent given by target-group background.

5.1.1 Target-Group Data Suggest True Absences

In some situations, target-group sites without records for a particular species can be interpreted as true absences. For example, in presence-only data collections, including some of those used here, many sites are research stations or other well-known sites that have been visited multiple times and have multiple recorded species constituting an inventory of species present there. Therefore, species that are not recorded at such sites are likely to be absent. If most target-group sites are well inventoried, then absence records can be derived by selecting sites that have a record from the target group but not for the species being modeled.

On the other hand, a lot of herbarium and museum records are there because a collector has noticed a species in an odd place (eg., it might be considered a range expansion), because the collector has a primary interest in that species, or because the species is rare and all occurrences are recorded. In such cases, the collector will not be recording all species from the target group.

In all experiments, we used all target-group records as background. We call this approach overlapping background, because the background data include presences of the modeled species (as it belongs to the target group). However, if target-group sites where the modeled species was not observed are true absences, then we expect better results if we treat them as such. To test this hypothesis, we removed the sites where the modeled species was recorded from the target-group background, resulting in what we call non-overlapping background. This removes the problem of contaminated controls (see Section 2.3) and results in a case-control sampling model. If the selection of survey sites is biased according to a distribution $\sigma$, then it results in a case-control sampling model for $P_o$ (y=1/x), which may be assumed to be equal to P(y=1|x) (but see Section 2.4). A presence-absence model fitted using non-overlapping background data can then be used to index probability of occurrence; if the species prevalence under a is known, then a case-control adjustment can be made in order to estimate probability of occurrence.

We tried this alternative approach (without a case-control adjustment, as species prevalence cannot be derived from our dataset) for the presence-absence methods in our study (Table 5). We observed very little difference in performance between the two background formulations. The biggest difference is a slight improvement in performance for GAM with overlapping background. Thus, for our dataset at least, there is no benefit to interpreting missing records from target-group sites as true absences.

5.2 Related Approaches

A related option is to use target-group background data to directly model survey effort. The surveyed sites are modeled against a random background sample from the region. The resulting model of survey effort can be used to make a weighted selection of background data, with higher probability sites being selected most often, for use in species distribution modeling. The advantage is that a large amount of biased background data can be produced, even if the target-group background data are limited. The danger is that the extra step of modeling introduces an extra source of error on top of the variability in model output caused by varying survey effort. The present study arose from a comparison of this method (which we term modeled target-group background) against target-group background and random background, using a subset of the species modeled by Elith. The preliminary results (not shown here) suggested that target-group background clearly outperforms modeled target-group background. The size of the improvement of target-group background over random background suggested that a larger study was warranted, resulting in the present paper.

Another approach for explicitly modeling survey effort is to include it as a level in a hierarchical Bayesian framework. One advantage of this approach is that the model gives explicit estimates of uncertainty in the predictions; in contrast, for the models we have considered here, uncertainty estimates are typically obtained by bootstrapping (generating separate models for random subsets of the training data, in order to derive pointwise variance in predictions). To our knowledge the hierarchical Bayesian approach has only been applied to presence-absence data, rather than the presence-only data that are the focus of this study, so it cannot be directly compared with the target-group background approach. Given presence records for only one species and no information on collection effort, a simple option is to define areas within the region where it is broadly possible that the species could occur. For example, if modeling a tree species in a landscape with substantial amounts of clearing for agriculture, spatial records of clearing (e.g., from remotely sensed data) could be used to define areas to be excluded from the set available for background data selection. Doing so would counteract a sample selection bias towards environmental conditions that are less suitable for agriculture, as long as the cleared areas correspond temporally with the species presence records. This is a special case of the biased background sampling approach we have described here, where the sampling intensity is zero in cleared areas, and uniform in other areas. An alternative approach to correct for this bias is to include land use as a predictor variable.

Engler used a single species approach to generate weighted background points for input to GAM. They used an ecological niche factor analysis (ENFA) to create "ENFA-weighted" background points by choosing points that were within the study region but unlikely to have the species (i.e., ENFA value less than 0.3). They compared this approach to random background, and found that it improved performance according to three out of four of their evaluation measures. This approach has the aim of having background data biased in favor of areas where the species is thought to be absent. In principle, this moves the sampling design away from a use-availability design and towards being a case-control design. However, the method of Engler does not address the issue of bias in the occurrence data, and the extra step of modeling in the generation of background data may introduce spatial and environmental bias in the controls and makes models difficult to interpret.

6 Conclusions

While the problem of sample selection bias has received much attention in other fields, it has not been adequately addressed for species distribution modeling. Sample selection bias is a serious problem for species distribution models derived from presence-only data, such as occurrence records in natural history museums and herbaria. It has a much greater impact on such models than it does on models derived from presence/absence data. When the sampling distribution is known, we have shown how sample selection bias can be addressed by using background data with the same bias as the occurrence data; our analysis holds for most of the commonly-used presence-only modeling methods. Sample selection bias has been previously explicitly considered only for some individual modeling methods.

When the sampling distribution is not known, it can be approximated by combining occurrence records for a target group of species that are all collected or observed using the same methods. We evaluated this approach on a diverse set of 226 species and 4 modeling methods. For both statistical measures of model performance that we used, target-group background improved predictive performance for all modeling methods, with the amount of improvement being comparable to the difference between the best and the worst of the 4 modeling methods. We conclude that the choice of background data is as important as the choice of modeling method when modeling species distributions using presence-only data.

TABLE 1

| Target Group | Region | Number of species | $AUC_{TG}$ | $AUC_{eval}$ |
|---|---|---|---|---|
| AWT-bird | Australian wet tropics | 20 | 0.8337 | 0.7887 |
| AWT-plant | Australian wet tropics | 20 | 0.841 | 0.5649 |
| CAN | Ontario, Canada | 20 | 0.9473 | 0.9216 |
| NSW-bird | New South Wales | 10 | 0.8789 | 0.877 |
| NSW-mammal | New South Wales | 7 | 0.9341 | 0.8402 |
| NSW-plant | New South Wales | 29 | 0.7054 | 0.6303 |
| NSW-reptile | New South Wales | 8 | 0.9219 | 0.8539 |
| NZ | New Zealand | 52 | 0.7443 | 0.7619 |
| SA | South America | 30 | 0.7502 | 0.7667 |
| SWI | Switzerland | 30 | 0.8564 | 0.8256 |

Table 1 presents target groups and measures of training and testing bias. For each target group, $AUC_{TG}$ is the AUC of training presence sites versus random background, for a Maxent model trained on all presence sites for the target group. $AUC_{eval}$ is the AUC of the same model evaluated using the set of test sites for that target group versus random background. A high value of $AUC_{TG}$ indicates that the training sites are highly biased, and that sample selection bias can be predicted well as a function of environmental conditions. A high value of $AUC_{eval}$ indicates that the test sites and training sites have similar strong biases.

TABLE 2

| | Random background | | Target-group background | |
|---|---|---|---|---|
| Model | AUC | COR | AUC | COR |
| BRT | 0.7275 | 0.2130 | 0.7544 | 0.2435 |
| Maxent | 0.7276 | 0.2100 | 0.7569 | 0.2446 |

TABLE 2-continued

|  | Random background | | Target-group background | |
| --- | --- | --- | --- | --- |
| Model | AUC | COR | AUC | COR |
| MARS | 0.6964 | 0.1787 | 0.7260 | 0.2145 |
| GAM | 0.6993 | 0.1765 | 0.7368 | 0.2196 |

Table 2 presents area under the Receiver Operating Characteristic curve (AUC) and correlation between predictions and 0-1 test data (COR) for the methods considered; values shown are averages over all 226 species. For random background models, background data were chosen uniformly at random from the study area. For target-group background, background data are the sites with presence records for any species from the same target group.

TABLE 3

Table 3: Coefficients for an analysis of variance for the AUC (top) and COR (bottom) evaluated on independent presence-absence test data for models of 226 species. Factors were species (per-species effects not shown), algorithm used to make the model (BRT, GAM, MARS or Maxent) and background data used for the model (random or target-group).

| AUC: | | | |
| --- | --- | --- | --- |
| Algorithm | | | |
| BRT | GAM | MARS | Maxent |
| 0.0128 | −0.0101 | −0.0169 | 0.0141 |
| Background | | | |
| Random | Target-group | | |
| −0.0154 | 0.0154 | | |
| Standard errors of effects | | | |
| Species | Algorithm | Background | |
| 0.0228 | 0.0030 | 0.0021 | |
| COR: | | | |
| Algorithm | | | |
| BRT | GAM | MARS | Maxent |
| 0.0157 | −0.0146 | −0.0160 | 0.0149 |
| Background | | | |
| Random | Target-group | | |
| −0.0180 | 0.0180 | | |
| Standard errors of effects | | | |
| Species | Algorithm | Background | |
| 0.0241 | 0.0032 | 0.0023 | |

TABLE 4

|  | Correlation with Training Bias | | Correlation with Test Bias | |
| --- | --- | --- | --- | --- |
| Model | Spearman's ρ | p-value | Spearman's ρ | p-value |
| Maxent | 0.87 | 0.002 | 0.81 | 0.008 |
| GAM | 0.90 | <0.001 | 0.93 | <0.001 |
| BRT | 0.75 | 0.017 | 0.87 | 0.002 |
| MARS | 0.84 | 0.004 | 0.95 | <0.001 |

Table 4 presents Spearman rank correlations of improvement in AUC when using target-group background instead of random background. The improvement is correlated against the degree of bias in the training data for each target group ("Training Bias") and a measure of how well the training data for each target group predicts the test sites ("Test Bias"). In each case, we give Spearman's rank correlation coefficient (ρ) and the two-sided p-value for the null hypotheses that ρ=0.

TABLE 5

Table 5: Performance of presence-absence methods using target-group background when presences for the modeled species are included in the background (Overlap) or excluded (Interspersed).

|  | Overlap background | | Interspersed background | |
| --- | --- | --- | --- | --- |
| Model | AUC | COR | AUC | COR |
| BRT | 0.7544 | 0.2435 | 0.7544 | 0.2442 |
| GAM | 0.7368 | 0.2196 | 0.7315 | 0.2092 |
| MARS | 0.7260 | 0.2145 | 0.7222 | 0.2102 |

7 Figure Legends

FIGS. 1 and 2 show effect of sample selection bias on predictive accuracy for an artificial species in Ontario. Probability of presence for the species is shown in FIG. 1, with darker shades indicating higher probabilities. FIG. 2 shows correlation between model output and true probability of presence, measured across the whole region (Y-axis), for various degrees of sample selection bias. Bias was introduced by sampling uniformly in the southern 25% of the region and uniformly b times lower in the northern 50% of the region, with a linear transition in between; the X axis shows values of b. Models were made using boosted regression trees with no interactions, fitted using 5-fold cross-validation.

FIGS. 3 and 4 show predicted probability of presence modeled from biased presence-only data (FIG. 3) and biased presence/absence data (FIG. 4). Both models were generated using boosted single-node regression trees, fitted with 5-fold cross-validation. Black and white dots show sampled locations used for model building. Sampling intensity in the southern 25% of the region was 50 times higher than in the northern 50% of the region, with a linear transition in between. The presence-only model is strongly influenced by the bias whereas the presence/absence model is not: compare with the true probability of presence in FIGS. 1 and 2.

FIG. 5 shows bias in the Canada training data used in Elith. Training sites for all species combined are shown as black-dots, and exhibit a strong bias towards the south of the region. Test sites exhibit a very similar pattern of bias (not shown). The region is shaded to indicate strength of prediction of a Maxent model trained on these training sites, with dark shades indicating stronger prediction. Note that the bias is stronger than the bias shown for the artificial species in FIGS. 3 and 4.

FIG. 6 shows performance using target-group background of methods in each of the modeled regions, measured using AUC on independent presence-absence test data.

FIG. 7 shows a plot of improvement in AUC on independent presence-absence test data when using target-group background instead of random background. Models were created using four methods (GAM, MARS, BRT, Maxent), and the minimum, average and maximum improvement in AUC across methods is shown for each target group. The X-axis is a measure of the amount of bias in training data for the target group. It is obtained by training a Maxent model using all presence sites for the target group, and measuring the AUC of the training sites relative to random background.

FIG. 8 shows a scatter plot of improvement in AUC on independent presence-absence test data when using target-group background instead of random background. The X-axis is a measure of how well target-group background predicts the distribution of test sites, namely, the AUC of a Maxent model trained on all presence sites for the target group and tested using all test sites for that group versus random background sites. Models were created using four methods (GAM, MARS, BRT, Maxent), and the minimum, average and maximum improvement in AUC across methods is shown for each target group.

FIGS. 9 and 10 show Maxent predictions in Ontario, Canada for the golden crowned kinglet, a widely-distributed generalist species, created without (FIG. 9) and with (FIG. 10) use of target-group background. Dark shades indicate stronger prediction, while white or black dots are presence sites used in training. Without target-group background, the prediction is similar to the model of sampling effort (FIG. 5). Target-group background results in stronger prediction in less sampled areas, reducing dependency of sampling effort.

REFERENCES

Anderson, R. P. (2003). Real vs. artefactual absences in species distributions: Tests for *Oryzomys albigularis* (Rodentia: Muridae) in Venezuela. *Journal of Biogeography* 30, 591-605.

Argaez, J. A., J. A. Christen, M. Nakamura, and J. Soberon (2005). Prediction of potential areas of species distributions based on presence-only data. *Environmental and Ecological Statistics* 12(1), 27-44.

Boyce, M. S., P. R. Vernier, S. E. Nielsen, and F. K. Schmiegelow (2002). Evaluating resource selection functions. *Ecological Modelling* 15, 281-300.

Busby, J. R. (1991). BIOCLIM—a bioclimate analysis and prediction system. In M. P. Austin and C. R. Margules (Eds.), *Nature Conservation: Cost Effective Biological Surveys and Data Analysis*, pp. 64-68. Melbourne: CSIRO.

Cadman, M. (2007). *Atlas of the Breeding Birds of Ontario, 2001-2005*. To appear; draft maps at www.birdsontario.org.

Carpenter, G., A. N. Gillison, and J. Winter (1993). DOMAIN: A _exible modeling procedure for mapping potential distributions of plants, animals. *Biodiversity and Conservation* 2, 667-680.

Cawsey, E. M., M. P. Austin, and B. L. Baker (2002). Regional vegetation mapping in Australia: a case study in the practical use of statistical modelling. *Biodiversity and Conservation* 11, 2239-2274.

Death, G. (2007). Boosted trees for ecological modeling and prediction. *Ecology* 88(1), 243-251.

Dennis, R. and C. Thomas (2000). Bias in butter_y distribution maps: the influence of hot spots and recorder's home range. *Journal of Insect Conservation* 4, 73-77.

Dudik, M., S. J. Phillips, and R. E. Schapire (2005). Correcting sample selection bias in maximum entropy density estimation. In *Advances in Neural Information Processing Systems* 18, pp. 323-330. The MIT Press.

Dudik, M., S. J. Phillips, and R. E. Schapire (2007). Maximum entropy density estimation with generalized regularization and an application to species distribution modeling. *Journal of Machine Learning Research* 8, 1217-1260.

Elith, J., C. H. Graham, R. P. Anderson, M. Dud_k, S. Ferrier, A. Guisan, R. J. Hijmans, F. Huettmann, J. R. Leathwick, A. Lehmann, J. Li, L. G. Lohmann, B. A. Loiselle, G. Manion, C. Moritz, M. Nakamura, Y. Nakazawa, J. M. Overton, A. T. Peterson, S. J. Phillips, K. Richardson, R. Scachetti-Pereira, R. E. Schapire, J. Soberon, S. Williams, M. S. Wisz, and N. E. Zimmerman (2006). Novel methods improve prediction of species' distributions from 31 occurrence data. *Ecography* 29(2), 129-151.

Elith, J. and J. Leathwick (2007). Predicting species distributions from museum and herbarium records using multire-sponse models _tted with multivariate adaptive regression splines. *Diversity and Distributions* 13, 265-275.

Engler, R., A. Guisan, and L. Rechsteiner (2004). An improved approach for predicting the distribution of rare and endangered species from occurrence and pseudo-absence data. *Journal of Applied Ecology* 41, 263-274.

Ferrier, S., G. Watson, J. Pearce, and M. Drielsma (2002). Extended statistical approaches to modelling spatial pattern in biodiversity in northeast New South Wales. 1. species-level modelling. *Biodiversity and Conservation* 11, 2275-2307.

Fielding, A. H. and J. F. Bell (1997). A review of methods for the assessment of prediction errors in conservation presence/absence models. *Environmental Conservation* 24, 38-49.

Friedman, J. (1991). Multivariate adaptive regression splines (with discussion). *The Annals of Statistics* 19, 1-141.

Friedman, J. H. (2001, October). Greedy function approximation: A gradient boosting machine. *The Annals of Statistics* 29(5), 1189-1232.

Gelfand, A. E., J. A. Silander Jr., S. Wuz, A. Latimer, P. O. Lewis, A. G. Rebelo, and M. Holder (2006). Explaining species distribution patterns through hierarchical modeling. *Bayesian Analysis* 1(1), 41-92.

Graham, C. H., S. Ferrier, F. Huettman, C. Moritz, and A. T. Peterson (2004). New developments inmuseum-based informatics and applications in biodiversity analysis. *TRENDS in Ecology and Evolution* 19(9), 497-503.

Guisan, A., N. Zimmermann, J. Elith, C. Graham, S. Phillips, and A. Peterson (2007). What matters for predicting spatial distributions of tree occurrences: techniques, data, or species' characteristics? *Ecological Monographs* 77(4), 615-630.

Hastie, T. and R. Tibshirani (1990). *Generalized additive models*. Chapman & Hall.

Heckman, J. J. (1979). Sample selection bias as a specification error. *Econometrica* 47(1), 153-161.

Hernandez, P., C. Graham, L. Master, and D. Albert (2006). The effect of sample size and species characteristics on performance of different species distribution modeling methods. *Ecography* 29, 773-785.

Hirzel, A. H., J. Hausser, D. Chessel, and N. Perrin (2002). Ecological-niche factor analysis: how to compute habitat-suitability maps without absence data? *Ecology* 87, 2027-2036.

Huang, J., A. J. Smola, A. Gretton, and K. M. Borgwardt (2007). Correcting sample selection bias by unlabeled data. In *Advances in Neural Information Processing Systems* 19. Cambridge, Mass.: MIT Press.

Jaynes, E. T. (1957). Information theory and statistical mechanics. *Physics Reviews* 106, 620-630.

Keating, K. A. and S. Cherry (2004). Use and interpretation of logistic regression in habitat-selection studies. *Journal of Wildlife Management* 68(4), 774-789.

Kozak, K., C. Graham, and J. Wiens (2008). Integrating GIS-based environmental data into evolutionary biology. *Trends in Ecology and Evolution*, in press.

Lancaster, T. and G. Imbens (1996). Case-control studies with contaminated controls. *Journal of Econometrics* 71, 145-160.

Leathwick, J., D. Rowe, J. Richardson, J. Elith, and T. Hastie (2005). Using multivariate adaptive regression splines to predict the distributions of New Zealand's freshwater diadromous fish. *Freshwater Biology* 50, 2034-2052.

Leathwick, J. R., J. Elith, M. P. Francis, T. Hastie, and P. Taylor (2006). Variation in demersal fish species richness in the oceans surrounding New Zealand: an analysis using boosted regression trees. In press, *Marine Ecology Progress Series* 321, 267-281.

Loiselle, B. A., C. A. Howell, C. H. Graham, J. M. Goerck, T. Brooks, K. G. Smith, and P. H. Williams (2003). Avoiding pitfalls of using species distribution models in conservation planning. *Conservation Biology* 17(6), 1591-1600.

Lutolf, M., F. Kienast, and A. Guisan (2006). The ghost of past species occurrence: improving species distribution models for presence-only data. *Journal of Applied Ecology* 43, 802-815.

Manly, B., L. McDonald, D. Thomas, T. McDonald, and W. Erickson (2002). *Resource Selection by Animals: Statistical Design and Analysis for Field Studies*, 2nd Edition. New York: Kluwer Press.

Peterson, A. T. and D. A. Kluza (2003). New distributional modelling approaches for gap analysis. *Animal Conservation* 6, 47-54.

Peterson, A. T., J. Soberon, and V. Sanchez-Cordero (1999). Conservatism of ecological niches in evolutionary time. *Science* 285, 1265-1267.

Phillips, S. and M. Dudik. Modeling of species distributions with Maxent: new extensions and a comprehensive evaluation. *Ecography*. in press.

Phillips, S. J., R. P. Anderson, and R. E. Schapire (2006). Maximum entropy modeling of species geographic distributions. *Ecological Modelling* 190, 231-259.

Ponder, W. F., G. A. Carter, P. Flemons, and R. R. Chapman (2001). Evaluation of museum collection data for use in biodiversity assessment. *Conservation Biology* 15, 648-657.

Reddy, S. and L. M. Davalos (2003). Geographical sampling bias and its implications for conservation priorities in Africa. *Journal of Biogeography* 30, 1719-1727.

Schulman, L., T. Toivonen, and K. Ruokolainen (2007). Analysing botanical collecting effort in Amazonia and correcting for it in species range estimation. *Journal of Biogeography* 34(8), 1388-1399.

Stockwell, D. and D. Peters (1999). The GARP modelling system: Problems and solutions to automated spatial prediction. *International Journal of Geographical Information Science* 13, 143-158.

Suarez, A. V. and N. D. Tsutsui (2004). The value of museum collections for research and society. *BioScience* 54(1), 66-74.

Thomas, C. D., A. Cameron, R. E. Green, M. Bakkenes, L. J. Beaumont, Y. C. Collingham, B. F. N. Erasmus, M. F. de Siqueira, A. Grainger, L. Hannah, L. Hughes, B. Huntley, A. S. van Jaarsveld, G. F. Midgley, L. Miles, M. A. Ortega-Huerta, A. T. Peterson, O. L. Phillips, and S. E. Williams (2004). Extinction risk from climate change. *Nature* 427, 145-148.

Thuiller, W., D. M. Richardson, P. Pys_ek, and G. F. Midgley (2005). Niche-based modelling as a tool for predicting the risk of alien plant invasions at a global scale. *Global Change Biology* 11, 2234-2250.

Ward, G., T. Hastie, S. Barry, J. Elith, and J. Leathwick. Presence-only data and the EM algorithm. Biometrics. In press.

Wiley, E. O., K. M. McNyset, A. T. Peterson, C. R.

Figure 11:
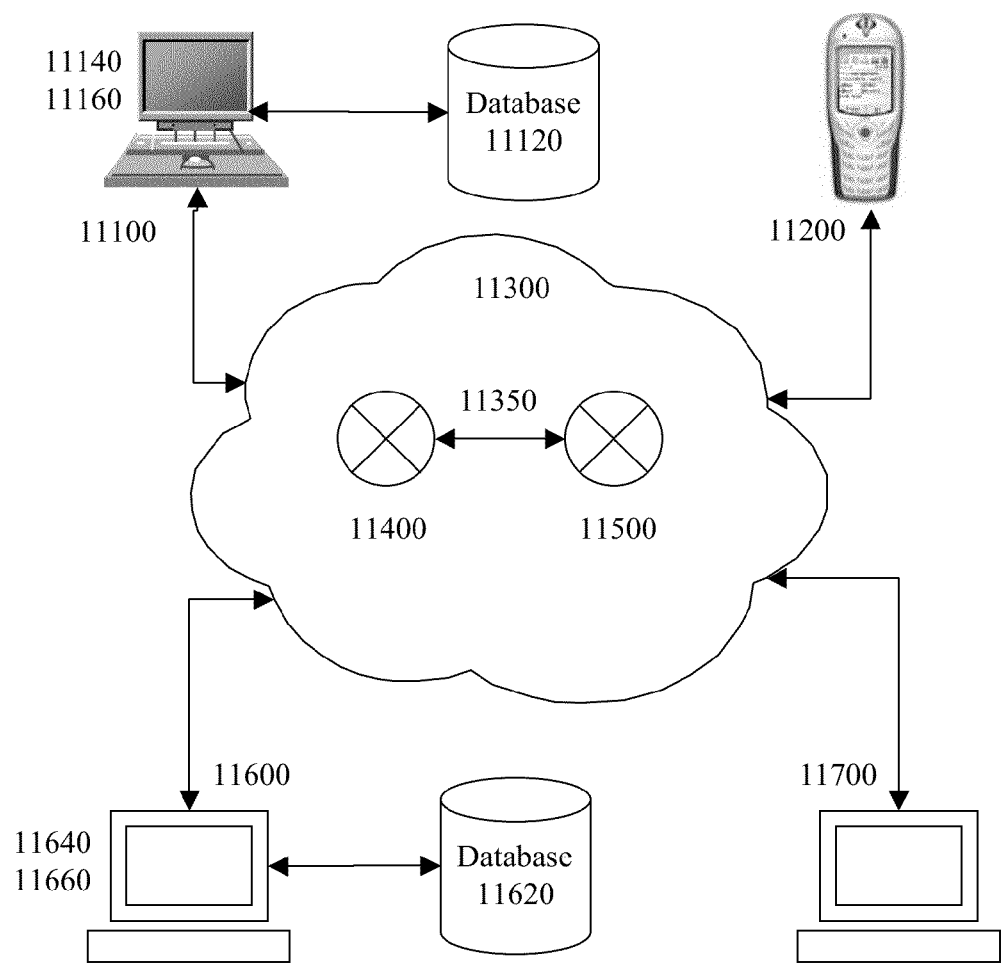
FIG. 11 is a block diagram of an exemplary embodiment of a system 11000.

FIG. 11 is a block diagram of an exemplary embodiment of a system 11000, which can comprise one or more client information devices 11100, 11200, any of which can be coupled to a database 11120, such as a database of background data and/or occurrence data, run a client program 11140, such as a program to determine an unbiased estimate as described herein, and/or render a human-machine interface 11160, such as an interface that presents a user-perceptible physically-measurable symbol that represents an unbiased estimate as described herein. Any of client information devices 11100, 11200, can be coupled to a network 11300, which can include network nodes 11400, 11500 (such as a router and/or switch) that are coupled together via a subnetwork 11350. Coupled to network 11300 can be one or more servers 11600, 11700, any of which can be coupled to a database 11620, such as a database of background data and/or occurrence data, run a server program 11640, such as a program to determine an unbiased estimate as described herein, and/or render a human-machine interface 11660, such as an interface that presents a user-perceptible physically-measurable symbol that represents an unbiased estimate as described herein. Such an estimate can relate to, for example, automatic translation of text from one language to another; automatic character recognition when performing optical character recognition; automatic identification of IP traffic type (e.g., web surfing, e-mail, video on demand, etc.), such as by automatic recognition of attributes of packets (header bits, packet length, etc.); detecting attacks, malware, etc.; etc. For example, a choice of text used for training a machine translator can create a bias. As another example, bias could arise if a training selection of prior attacks or malware is limited. Yet certain exemplary embodiments can determine that if current traffic looks different from prior attacks and looks different from prior normal traffic, then it probably is an attack.

Figure 12:
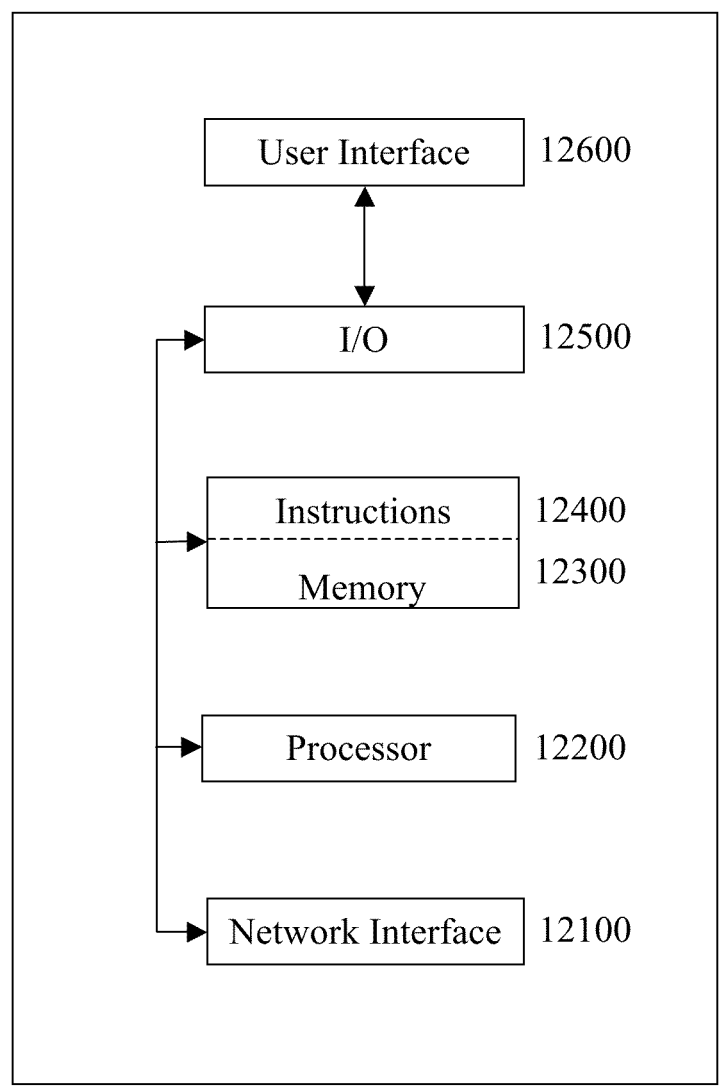
FIG. 12 is a block diagram of an exemplary embodiment of an information device 12000.

FIG. 12 is a block diagram of an exemplary embodiment of an information device 12000, which in certain operative embodiments can comprise, for example, client information devices 11100, 11200, network nodes 11400, 11500, and/or servers 11600, 11700, of FIG. 11. Information device 12000 can comprise any of numerous circuits and/or components, such as for example, one or more network interfaces 12100, one or more processors and/or special purpose processors 12200, one or more memories 12300 containing instructions 12400, one or more input/output (I/O) devices 12500, and/or one or more user interfaces 12600 coupled to I/O device 12500, etc.

In certain exemplary embodiments, via one or more user interfaces 12600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Figure 13:
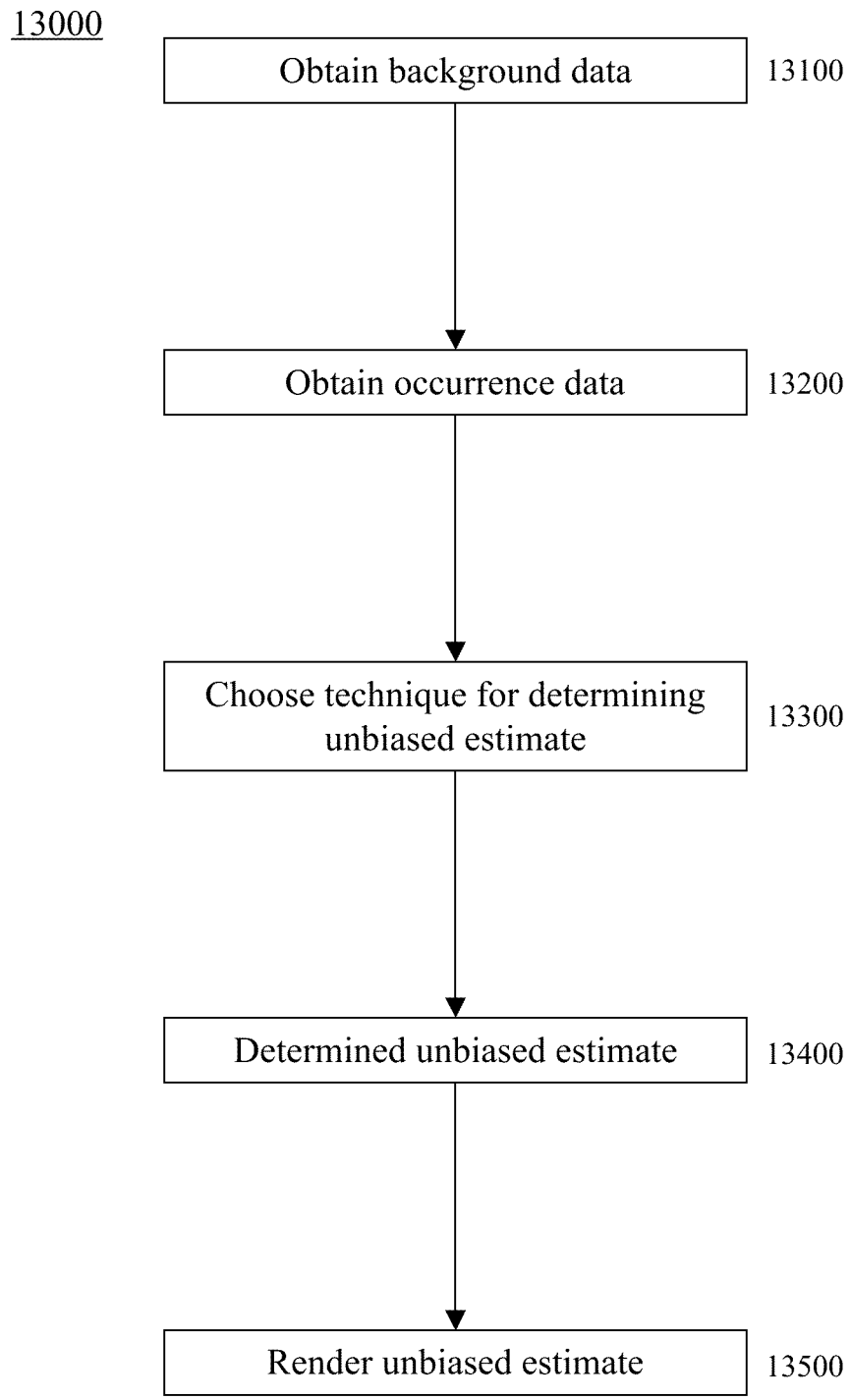
FIG. 13 is a flowchart of an exemplary embodiment of a method 13000.

FIG. 13 is a flowchart of an exemplary embodiment of a method 13000, which can be performed via a circuit and/or machine, and/or can be stored on a machine-readable medium as machine-implementable instructions that are adapted to cause a special purpose computer to perform its activities. At activity 13100, the background data can be obtained. At activity 13200, the occurrence data can be obtained.

For a network management scenario, as measured at a selected node of a network and/or subnetwork, such as at a predetermined switch and/or router, the background data can comprise a random sample of packets transmitted across the network and/or the subnetwork, and the occurrence data can be a sampling of packets transmitted in a predetermined transmission across the network and/or the subnetwork.

For a network attack and/or malware detection scenario, as measured at a selected node of a network and/or subnetwork, the background data can comprise a random sample of traffic and/or packets transmitted across the network and/or the subnetwork, and the occurrence data can be a sampling of traffic and/or packets from an attack and/or malware transmission.

For a language translation and/or speech interpretation scenario, as performed at a selected node of a network and/or subnetwork, the background data can comprise a random sample of sentences in the source language, and the occurrence data can be a sampling of sentences in the source language whose translations contain a predetermined word. Such data can be obtained from, for example, English and French transcripts of UN proceedings.

At activity 13300, the technique for determining the unbiased estimate can be chosen. For example, as described herein, the maximum entropy technique can work by first determining a set of constraints that the distribution likely satisfies, and then returning the distribution of maximum entropy subject to those constraints. As described herein, regression techniques can work by positing a general functional form for the relationship between a response variable and some predictor variables, then finding the parameters that minimize some penalty function, often by maximizing the likelihood of the training data and/or background data. The training data can be unlabeled and/or fully labeled, and/or can comprise positive and/or negative examples. Certain exemplary embodiments can apply scenarios where the positive and negative examples are collected separately (e.g., positive "cases" and negative "controls" in a "case-control" study, such as an epidemiological study) and are therefore subject to different biases.

At activity 13400, the unbiased estimate can be determined. At activity 13500, the unbiased estimate can be rendered. Thus, an estimate of a probability density under sample selection bias can be provided and/or the background data can be selected so that they reflect the same sample selection bias as the occurrence data.

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, deed, function, step, and/or process and/or a portion thereof.

adapted—suitable, fit, and/or capable of performing a specified function.

and/or—either in conjunction with or in alternative to.

apparatus—an appliance and/or device for a particular purpose.

attack—one or more malicious and/or offensive acts occurring via a network.

automatically—acting and/or operating in a manner essentially independent of external human influence and/or control. For example, an automatic light switch can turn on upon "seeing" a person in its view, without the person manually operating the light switch.

backbone network—a "transit" network often made up of long-distance telephone trunk lines and/or other wired and/or wireless links such as microwave and satellite links for use in transmitting large amounts of data simultaneously between host computer systems connected to the Internet. Normal communicated data typically neither originates nor terminates in a backbone network.

background—the circumstances and/or events surrounding and/or leading up to an event and/or occurrence.

bias—a statistical sampling or testing error caused by systematically favoring some data and/or outcomes over others.

Boolean logic—a complete system for logical operations.

can—is capable of, in at least some embodiments.

cause—to bring about, provoke, precipitate, produce, elicit, be the reason for, result in, and/or effect.

chosen—selected from a number of possible alternatives.

circuit—an physical system comprising: an electrically conductive pathway and/or a communications connection established across a switching device (such as logic gates); and/or an electrically conductive pathway and/or a communications connection established across two or more switching devices comprised by a network and between corresponding end systems connected to, but not comprised by the network.

comprising—including but not limited to, what follows.

constrain—to restrict, limit, regulate, and/or restrain within bounds.

constraint—that which restrains, restricts, limits, and/or regulates.

data—distinct pieces of information, usually formatted in a special or predetermined way and/or organized to express concepts, and/or represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

determine—to obtain, calculate, find, decide, deduce, establish, and/or ascertain.

device—a machine, manufacture, and/or collection thereof adapted to a particular purpose.

digital—non-analog; discrete.

distribution—a set of data, events, occurrences, outcomes, objects, and/or entities and their frequency of occurrence collected from measurements over a statistical population.

equivalent—equal.

estimate—(n) a calculated value approximating an actual value; (v.) to calculate and/or determine approximately and/or tentatively.

from—used to indicate a source.

further—in addition.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

human-machine interface—hardware and/or software adapted to render information to a user and/or receive information from the user; and/or a user interface.

implement—to accomplish some aim and/or execute some order.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function. Can be implemented as firmware and/or software.

interface—(n) a boundary across which two independent systems meet and act on and/or communicate with each other. (v) to connect with and/or interact with by way of an interface.

likelihood—a probability.

likely—statistically determined to be have a probability of at least 50%.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

machine-implementable instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain machine-implementable instructions, data, and/or information. Examples include a memory device, punch cards, etc.

maximum—out of a sequence of data points, the data point having the largest magnitude as measured along the non-time axis; a measure of the magnitude of such a data point.

may—is allowed and/or permitted to, in at least some embodiments.

measurable—qualifiable and/or quantifiable.

measure—(n) a quantity ascertained by comparison with a standard. (v) to physically sense, and/or determine a value and/or quantity of something relative to a standard.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not preempting all uses of a fundamental principal.

model—a mathematical and/or schematic description of an entity and/or system.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications there between. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, USB, FireWire, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

node—an information device coupled to a network.

object—a real thing.

obtain—to receive, get, take possession of, procure, acquire, calculate, determine, and/or compute.

occurrence—an action, fact, and/or instance of occurring; and/or something that takes place.

output device—an apparatus configured to visually, audibly, and/or haptically render information to a human. Examples include an audible output sub-system (e.g., speaker, horn, buzzer, and/or piezoelectric transducer, etc.), a visual output sub-system (e.g., flag, marker, light, liquid crystal display (LCD), light emitting diode (LED), optical fiber, organic polymer display, electric paper, screen, display, monitor, and/or tube, etc.), and a haptic output sub-system (e.g., buzzer, vibrator, bulging portion, tactile stimulator, cooler, and/or heater, etc.), etc.

packet—a discrete instance of communication and/or a collection of digital data comprised of information and an associated header adapted for transmission over a packet-switching network.

parameter—a sensed, measured, and/or calculated value.

particular—of, or associated with, a distinct and/or specific entity, thing, person, group, place, activity, and/or category.

perceptible—capable of being perceived by the human senses.

perform—to begin, take action, do, fulfill, accomplish, carry out, and/or complete, such as in accordance with one or more criterion.

physical—tangible, real, and/or actual.

physically—existing, happening, occurring, acting, and/or operating in a manner that is tangible, real, and/or actual.

plurality—the state of being plural and/or more than one.

portion—a part, component, section, percentage, ratio, and/or quantity that is less than a larger whole. Can be visually, physically, and/or virtually distinguishable and/or non-distinguishable.

predetermined—determine, decide, and/or establish in advance.

probability—a quantitative representation of a likelihood of an event and/or occurrence.

processor—a hardware, firmware, and/or software machine and/or virtual machine physically adaptable to perform, via boolean logic operating on a plurality of logic gates, a specific task defined by a set of machine implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

randomly—of or relating to an event in which possible outcomes are determined by chance.

record—to retrievably store and/or preserve information on a tangible medium.

regression—a relationship between the mean value of a random variable and the corresponding values of one or more independent variables.

related—connected to and/or associated with.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

represent—to describe, symbolize, and/or be considered as an acceptable equivalent of.

representation—an approximation, equivalent, mathematical characterization, rendering, image, and/or likeness of something.

router—a device adapted to direct traffic and/or determine the next network point to which a data packet should be forwarded enroute toward its destination. The router is connected to at least two networks and determines which way to send each data packet based on its current understanding of the state of the networks it is connected to. Routers create or maintain a table of the available routes and use this information to determine the best route for a given data packet. Examples include a router, route-reflector, route server, server-based router, router-switch, sets of routers, and/or intra-networking devices, etc. A typical router operates at least at the bottom 3 layers (Physical, Link, and Network layers) of the OSI model.

sample—(n) a set of elements drawn from and analyzed to estimate the characteristics of a population; and/or a portion, piece, and/or segment that is representative of a whole. (v) to take and/or obtain one or more measurements at random and/or predetermined times.

sampling—the act of taking periodic measurements and/or readings of a continuous phenomena, such as an analog signal.

satisfy—to fulfill, conform to, and/or be sufficient.

screen—a video display and/or monitor.

select—to make and/or indicate a choice and/or selection from among alternatives.

selection—the act of choosing and/or selecting and/or an assortment of things from which a choice can be made; a choice.

set—a related plurality of predetermined elements; and/or one or more distinct items and/or entities having a specific common property or properties.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

source—an original and/or intermediate transmitter of traffic and/or a related group of such transmitters and/or a point at which something originates, springs into being, and/or from which it derives and/or is obtained.

special purpose computer—a computer comprising a processor having a plurality of logic gates, whereby at least a portion of those logic gates, via execution of specific machine instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine instructions to the logic gate's specific configuration and property(ies). In the context of an electronic computer, each such change in the logic gates creates a specific electrical circuit, thereby directly tying the specific machine instructions to that specific electrical circuit.

special purpose processor—a processor, having a plurality of logic gates, whereby at least a portion of those logic gates, via execution of specific machine instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine instructions to the logic gate's specific configuration and property(ies). In the context of an electronic computer, each such change in the logic gates creates a specific electrical circuit, thereby directly tying the specific machine instructions to that specific electrical circuit.

speech—something spoken, an utterance, a vocal communication, and/or a conversation.

store—to place, hold, retain, enter, and/or copy into and/or onto a machine-readable medium.

subnetwork—a portion of a network.

substance—matter and/or that which has mass and occupies space.

substantially—to a considerable, large, and/or great, but not necessarily whole and/or entire, extent and/or degree.

symbol—something that represents something else (e.g., an item, article, operation, element, quantity, quality, variable, property, relation, unit of measurement, phenomenon, and/or descriptor) by association, resemblance, and/or convention.

system—a collection of mechanisms, devices, machines, articles of manufacture, processes, data, and/or instructions, the collection designed to perform one or more specific functions.

tangible—measurable.

technique—a method.

traffic—a flow of bits, packets, datagrams, calls, and/or messages.

transform—to change in measurable: form, appearance, nature, and/or character.

translation—the act and/or process of translating, especially from one language into another.

transmission—a conveyance of information from one location to another.

transmit—to provide, furnish, supply, send as a signal, and/or to convey (e.g., force, energy, and/or information) from one place and/or thing to another.

traverse—to pass and/or travel along, over, and/or through.

unbiased—lacking bias.

user—a person, organization, process, device, program, protocol, and/or system that uses a device, system, process, and/or service.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

variable—(n) a property, parameter, and/or characteristic capable of assuming any of an associated set of values. (adj) likely to change and/or vary; subject to variation; and/or changeable.

via—by way of and/or utilizing.

visual—visible.

weight—a value indicative of importance.

wherein—in regard to which; and; and/or in addition to.

NOTE

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values there between, such as for example, 1.1, 2.5, 3.335, 5, 6.179, 8.9999, etc., and includes all subranges there between, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system for managing sample selection bias, comprising;
    a memory that stores instructions; and
    a processor that executes the instructions to perform operations, the operations comprising:
    randomly selecting sentences in a source language to obtain background data, wherein the background data has a background data sample selection bias that is equivalent to an occurrence data sample selection bias of occurrence data;
    sampling sentences in the source language that contain a predetermined word to obtain the occurrence data, wherein the predetermined word is contained in translations of the sentences sampled in the source language; and
    determining an unbiased estimate of a distribution utilized for language translation from the occurrence data, wherein the occurrence data is related to the background data.

2. The system of claim 1, wherein the operations further comprise selecting the background data such that the background data and the occurrence data have equivalent environmental biases.

3. The system of claim 1, wherein the operations further comprising determining a set of constraints that the distribution satisfies.

4. The system of claim 3, wherein the operations further comprise determining a distribution of maximum entropy that is subject to the set of constraints.

5. The system of claim 1, wherein the operations further comprise determining parameters that minimize a penalty function and maximize a likelihood of the background data.

6. The system of claim 1, wherein the operations further comprise determining the unbiased estimate by utilizing a regression technique.

7. The system of claim 1, wherein the unbiased estimate of the distribution is further utilized for speech interpretation.

8. The system of claim 1, wherein the occurrence data represents a physically-measurable variable of a physical and tangible object, and a physical and tangible substance.

9. The system of claim 1, wherein the operations further comprise rendering a symbol that represents the unbiased estimate of the distribution via an interface.

10. A method for managing sample selection bias, comprising;
   randomly selecting sentences in a source language to obtain background data, wherein the background data has a background data sample selection bias that is equivalent to an occurrence data sample selection bias of occurrence data;
   sampling sentences in the source language that contain a predetermined word to obtain the occurrence data, wherein the predetermined word is contained in translations of the sentences sampled in the source language; and
   determining an unbiased estimate of a distribution utilized for speech interpretation from the occurrence data by utilizing instructions stored in memory and executed by a processor, wherein the occurrence data is related to the background data.

11. The method of claim 10, further comprising rendering a symbol that represents the unbiased estimate of the distribution via an interface.

12. The method of claim 10, further comprising selecting the background data such that the background data and the occurrence data have environmental biases that are the same.

13. The method of claim 10, wherein the unbiased estimate of the distribution is further utilized for language translation.

14. The method of claim 10, further comprising determining parameters that minimize a penalty function and maximize a likelihood of the background data.

15. The method of claim 10, further comprising determining a set of constraints that the distribution satisfies.

16. The method of claim 15, further comprising determining a distribution of maximum entropy that is subject to the set of constraints.

17. The method of claim 10, further comprising randomly selecting the sentences and sampling the sentences at a selected node of a network.

18. A computer-readable device comprising instructions, which when executed by a processor, cause the processor to perform operations comprising:
   randomly selecting sentences in a source language to obtain background data, wherein the background data has a background data sample selection bias that is equivalent to an occurrence data sample selection bias of occurrence data;
   sampling sentences in the source language that contain a predetermined word to obtain the occurrence data, wherein the predetermined word is contained in translations of the sentences sampled in the source language; and
   determining an unbiased estimate of a distribution from the occurrence data, wherein the occurrence data is related to the background data.

* * * * *